(12) United States Patent
Zhang et al.

(10) Patent No.: US 11,029,495 B2
(45) Date of Patent: Jun. 8, 2021

(54) OPTICAL IMAGING LENS ASSEMBLY

(71) Applicant: ZHEJIANG SUNNY OPTICAL CO., LTD., Ningbo (CN)

(72) Inventors: Kaiyuan Zhang, Ningbo (CN); Ming Li, Ningbo (CN); Yabin Hu, Ningbo (CN)

(73) Assignee: ZHEJIANG SUNNY OPTICAL CO., LTD., Ningbo (CN)

( * ) Notice: Subject to any disclaimer, the term of this patent is extended or adjusted under 35 U.S.C. 154(b) by 206 days.

(21) Appl. No.: 16/231,141

(22) Filed: Dec. 21, 2018

(65) Prior Publication Data

US 2019/0121104 A1   Apr. 25, 2019

Related U.S. Application Data

(63) Continuation of application No. PCT/CN2018/088684, filed on May 28, 2018.

(30) Foreign Application Priority Data

Aug. 7, 2017 (CN) .......................... 201710665825.9
Aug. 7, 2017 (CN) .......................... 201720976061.0

(51) Int. Cl.
*G02B 13/00* (2006.01)
*G02B 9/60* (2006.01)
(Continued)

(52) U.S. Cl.
CPC ........... *G02B 13/0045* (2013.01); *G02B 9/60* (2013.01); *G02B 13/02* (2013.01); *G02B 13/18* (2013.01)

(58) Field of Classification Search
CPC .............................. G02B 13/0045; G02B 9/60
(Continued)

(56) References Cited

U.S. PATENT DOCUMENTS

| 8,179,613 B2 * | 5/2012 | Sano | G02B 13/0045 |
| | | | 359/714 |
| 8,203,796 B2 * | 6/2012 | Ohtsu | G02B 13/0045 |
| | | | 359/714 |

(Continued)

FOREIGN PATENT DOCUMENTS

| CN | 202256842 U | 5/2012 |
| CN | 104375260 A | 2/2015 |

(Continued)

*Primary Examiner* — Zachary W Wilkes
(74) *Attorney, Agent, or Firm* — Hauptman Ham, LLP

(57) ABSTRACT

The present disclosure discloses an optical imaging lens assembly. The optical imaging lens assembly includes, sequentially along an optical axis from an object side to an image side, a first lens to a fifth lens. The first lens has a positive refractive power, and an object-side surface thereof is a convex surface. The second lens has a negative refractive power, an object-side surface thereof is a convex surface, and an image-side surface thereof is a concave surface. The third lens has a positive refractive power or a negative refractive power. The fourth lens has a positive refractive power, and an object-side surface thereof is a concave surface. The fifth lens has a negative refractive power, and an image-side surface thereof is a convex surface. An effective focal length f1 of the first lens and an effective focal length f2 of the second lens satisfy: $-0.9 < f1/f2 < -0.5$.

11 Claims, 20 Drawing Sheets

(51) Int. Cl.
*G02B 13/02* (2006.01)
*G02B 13/18* (2006.01)

(58) Field of Classification Search
USPC .............................. 359/763–764, 714, 765
See application file for complete search history.

(56) References Cited

U.S. PATENT DOCUMENTS

| | | | |
|---|---|---|---|
| 8,456,757 B2 | 6/2013 | Tsai et al. | |
| 9,279,957 B2* | 3/2016 | Kanda | G02B 13/0045 |
| 9,310,590 B1 | 4/2016 | Liao | |
| 9,402,032 B2* | 7/2016 | Dror | G02B 13/0045 |
| 10,732,391 B2* | 8/2020 | Yeh | G02B 13/0045 |
| 10,739,570 B2* | 8/2020 | Chen | G02B 9/60 |
| 2012/0327520 A1 | 12/2012 | Tsai et al. | |
| 2015/0029601 A1 | 1/2015 | Dror et al. | |
| 2018/0088300 A1* | 3/2018 | Liao | G02B 9/60 |

FOREIGN PATENT DOCUMENTS

| | | |
|---|---|---|
| CN | 106990508 A | 7/2017 |
| CN | 107219614 A | 9/2017 |
| CN | 207096550 U | 3/2018 |

\* cited by examiner

OPTICAL IMAGING LENS ASSEMBLY

CROSS-REFERENCE TO RELATED APPLICATIONS

This application is a continuation of International Application No. PCT/CN2018/088684, filed on May 28, 2018, which claims the priorities and rights to Chinese Patent Application No. 201710665825.9 and Chinese Patent Application No. 201720976061.0 filed with the China National Intellectual Property Administration (CNIPA) on Aug. 7, 2017. All of the aforementioned applications are hereby incorporated by reference in their entireties.

TECHNICAL FIELD

The present disclosure relates to an optical imaging lens assembly, and more specifically to an ultra-thin telephoto lens assembly including five lenses.

BACKGROUND

With the reduction in thickness and size of portable electronic products such as cell phones and tablet computers, higher requirements on miniaturization of the imaging lens assemblies suitable for the portable electronic products have been brought forward.

In general, the miniaturization of an imaging lens assembly may be achieved by reducing the number of lenses in an lens assembly. However, the lack of design freedom caused by the reduction of the number of the lenses will make the lens assembly difficult to meet market demands for the high imaging performance.

In the currently emerging dual-camera technology, high spatial angular resolution may be obtained through a telephoto lens assembly, and the enhancement of high frequency information may be realized through an image fusion technology. Thus, the market demands for the high imaging performance can be satisfied. However, in the dual-camera technology, the design of the telephoto lens assembly is particularly important, and it is an urgent problem to be solved to design a telephoto lens assembly to satisfy the telephoto and ultrathin characteristics at the same time.

SUMMARY

The present disclosure provides an optical imaging lens assembly which may be applicable to portable electronic products and may at least or partially solve at least one of the above disadvantages in the existing technology, for example, an ultra-thin telephoto lens assembly.

According to an aspect, the present disclosure provides an optical imaging lens assembly. The optical imaging lens assembly includes, sequentially along an optical axis from an object side to an image side, a first lens, a second lens, a third lens, a fourth lens, and a fifth lens. The first lens may have a positive refractive power, and an object-side surface of the first lens may be a convex surface. The second lens may have a negative refractive power, an object-side surface of the second lens may be a convex surface, and an image-side surface of the second lens may be a concave surface. The third lens may have a positive refractive power or a negative refractive power. The fourth lens may have a positive refractive power, and an object-side surface of the fourth lens may be a concave surface. The fifth lens may have a negative refractive power, and an image-side surface of the fifth lens may be a convex surface. An effective focal length f1 of the first lens and an effective focal length f2 of the second lens may satisfy: $-0.9<f1/f2<-0.5$.

In an implementation, a combined refractive power of the first lens, the second lens, and the third lens may be a positive refractive power. A combined focal length f123 of the first lens, the second lens, and the third lens and a spacing distance T34 on the optical axis between the third lens and the fourth lens may satisfy: $3.5<f123/T34<7.0$.

In an implementation, a combined refractive power of the fourth lens and the fifth lens may be a negative refractive power. A combined focal length f45 of the fourth lens and the fifth lens and a total effective focal length f of the optical imaging lens assembly may satisfy: $-1.0<f/f45<-0.2$.

In an implementation, a spacing distance T12 on the optical axis between the first lens and the second lens may satisfy: $0.05\ \text{mm} \leq T12 \leq 0.5\ \text{mm}$.

In an implementation, a spacing distance T23 on the optical axis between the second lens and the third lens and a center thickness CT3 of the third lens on the optical axis may satisfy: $1<T23/CT3<2.5$.

In an implementation, a radius of curvature R3 of the object-side surface of the second lens and a radius of curvature R4 of the image-side surface of the second lens may satisfy: $0<R4/R\leq 30.5$.

In an implementation, a radius of curvature R7 of the object-side surface of the fourth lens and a radius of curvature R10 of the image-side surface of the fifth lens may satisfy: $0<R7/R10<1.5$.

In an implementation, the total effective focal length f of the optical imaging lens assembly and the radius of curvature R10 of the image-side surface of the fifth lens may satisfy: $-1.0<f/R10<0$.

In an implementation, an abbe number V4 of the fourth lens and an abbe number V5 of the fifth lens satisfy: $|V4-V5|>20$.

In an implementation, an axial distance TTL from the object-side surface of the first lens to an image plane of the optical imaging lens assembly and the total effective focal length f of the optical imaging lens assembly may satisfy: $TTL/f<0.95$.

In an implementation, the optical imaging lens assembly further includes a diaphragm. An axial distance SL from the diaphragm to the image plane of the optical imaging lens assembly and the axial distance TTL from the object-side surface of the first lens to the image plane of the optical imaging lens assembly may satisfy: $SL/TTL \leq 0.9$.

According to another aspect, the present disclosure provides an optical imaging lens assembly. The optical imaging lens assembly includes, sequentially along an optical axis from an object side to an image side, a first lens, a second lens, a third lens, a fourth lens, and a fifth lens. Each of the first lens and the fourth lens may have a positive refractive power. At least two of the second lens, the third lens, and the fifth lens may have negative refractive powers. An object-side surface of the first lens and an object-side surface of the second lens may both be convex surfaces. An image-side surface of the second lens and an object-side surface of the fourth lens may both be concave surfaces. An image-side surface of the fifth lens may be a convex surface. A radius of curvature R10 of the image-side surface of the fifth lens and a total effective focal length f of the optical imaging lens assembly may satisfy: $-1.0<f/R10<0$.

In an implementation, the optical imaging lens assembly further includes a diaphragm. An axial distance SL from the diaphragm to an image plane of the optical imaging lens assembly and an axial distance TTL from the object-side surface of the first lens to the image plane of the optical imaging lens assembly may satisfy: SL/TTL≤0.9.

In an implementation, an abbe number V4 of the fourth lens and an abbe number V5 of the fifth lens may satisfy: |V4−V5|>20.

In an implementation, each of the second lens and the fifth lens may have a negative refractive power.

In an implementation, an effective focal length f1 of the first lens and an effective focal length f2 of the second lens may satisfy: −0.9<f1/f2<−0.5.

In an implementation, a combined refractive power of the first lens, the second lens, and the third lens may be a positive refractive power. A combined focal length f123 of the first lens, the second lens, and the third lens and a spacing distance T34 on the optical axis between the third lens and the fourth lens may satisfy: 3.5<f123/T34<7.0.

In an implementation, a combined refractive power of the fourth lens and the fifth lens may be a negative refractive power. A combined focal length f45 of the fourth lens and the fifth lens and the total effective focal length f of the optical imaging lens assembly may satisfy: −1.0<f/f45<−0.2.

In an implementation, a spacing distance T12 on the optical axis between the first lens and the second lens may satisfy: 0.05 mm≤T12≤0.5 mm.

In an implementation, a spacing distance T23 on the optical axis between the second lens and the third lens and a center thickness CT3 of the third lens on the optical axis may satisfy: 1<T23/CT3<2.5.

In an implementation, a radius of curvature R3 of the object-side surface of the second lens and a radius of curvature R4 of the image-side surface of the second lens may satisfy: 0<R4/R3≤0.5.

In an implementation, a radius of curvature R7 of the object-side surface of the fourth lens and the radius of curvature R10 of the image-side surface of the fifth lens may satisfy: 0<R7/R10<1.5.

In an implementation, the axial distance TTL from the object-side surface of the first lens to the image plane of the optical imaging lens assembly and the total effective focal length f of the optical imaging lens assembly may satisfy: TTL/f<0.95.

According to another aspect, the present disclosure further provides an optical imaging lens assembly. The optical imaging lens assembly includes, sequentially along an optical axis from an object side to an image side, a first lens, a second lens, a third lens, a fourth lens, and a fifth lens. Each of the first lens and the fourth lens may have a positive refractive power. At least two of the second lens, the third lens, and the fifth lens may have negative refractive powers. A spacing distance T12 on the optical axis between the first lens and the second lens may satisfy: 0.05 mm≤T12≤0.5 mm. A combined focal length f123 of the first lens, the second lens, and the third lens and a spacing distance T34 on the optical axis between the third lens and the fourth lens may satisfy: 3.5<f123/T34<7.0.

In an implementation, an effective focal length f1 of the first lens and an effective focal length f2 of the second lens may satisfy: −0.9<f1/f2<−0.5.

In an implementation, each of the second lens and the fifth lens may have a negative refractive power.

In an implementation, a combined refractive power of the fourth lens and the fifth lens may be a negative refractive power. A combined focal length f45 of the fourth lens and the fifth lens and a total effective focal length f of the optical imaging lens assembly may satisfy: −1.0<f/f45<−0.2.

In an implementation, an object-side surface of the second lens may be a convex surface, and an image-side surface of the second lens may be a concave surface.

In an implementation, a radius of curvature R3 of the object-side surface of the second lens and a radius of curvature R4 of the image-side surface of the second lens may satisfy: 0<R4/R3≤0.5.

In an implementation, an image-side surface of the fifth lens may be a convex surface. A radius of curvature R10 of the image-side surface of the fifth lens and the total effective focal length f of the optical imaging lens assembly may satisfy: −1.0<f/R10<0.

In an implementation, an object-side surface of the fourth lens may be a concave surface, and the image-side surface of the fifth lens may be the convex surface. A radius of curvature R7 of the object-side surface of the fourth lens and the radius of curvature R10 of the image-side surface of the fifth lens may satisfy: 0<R7/R10<1.5.

In an implementation, a spacing distance T23 on the optical axis between the second lens and the third lens and a center thickness CT3 of the third lens on the optical axis may satisfy: 1<T23/C13<2.5.

In an implementation, an abbe number V4 of the fourth lens and an abbe number V5 of the fifth lens may satisfy: |V4−V5|>20.

In an implementation, an axial distance TTL from an object-side surface of the first lens to an image plane of the optical imaging lens assembly and the total effective focal length f of the optical imaging lens assembly may satisfy: TTL/f<0.95.

In an implementation, the optical imaging lens assembly further includes a diaphragm. An axial distance SL from the diaphragm to the image plane of the optical imaging lens assembly and the axial distance TTL from the object-side surface of the first lens to the image plane of the optical imaging lens assembly may satisfy: SL/TTL≤0.9.

The present disclosure adopts, for example, five lenses. By reasonably distributing the refractive powers and the surface types of the lenses, the center thicknesses of the lenses, the spacing distances on the optical axis between the lenses, etc., the lens assembly has at least one of the beneficial effects such as ultra-thin, miniaturization, long focal length, and high resolution, while achieving a good imaging quality.

BRIEF DESCRIPTION OF THE DRAWINGS

By describing non-limiting implementations below in detail and in combination with the accompanying drawings, other features, objectives and advantages of the present disclosure will be more apparent. In the accompanying drawings.

DETAILED DESCRIPTION

Figure 1:
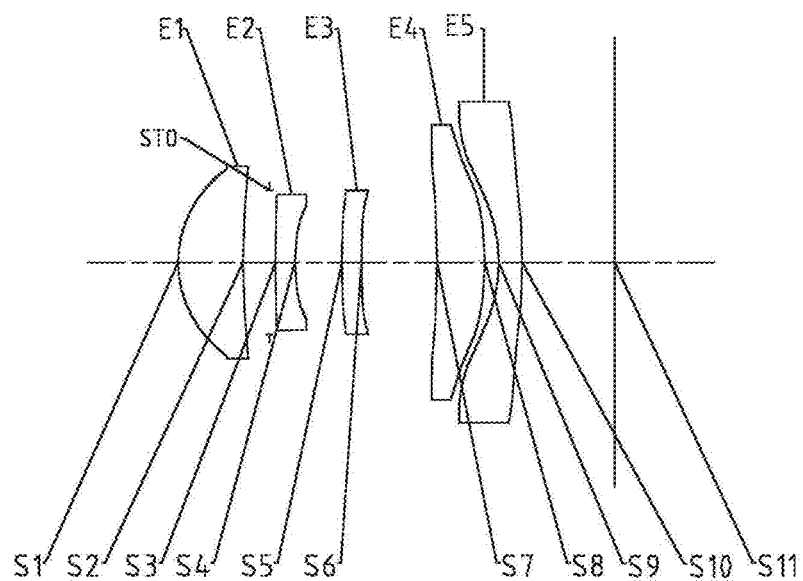
FIG. 1 is a schematic structural diagram illustrating an optical imaging lens assembly according to Embodiment 1 of the present disclosure.

For a better understanding of the present disclosure, various aspects of the present disclosure will be described in more detail with reference to the accompanying drawings. It should be understood that the detailed description is merely an illustration for the exemplary implementations of the present disclosure rather than a limitation to the scope of the present disclosure in any way. Throughout the specification, the same reference numerals designate the same elements. The expression "and/or" includes any and all combinations of one or more of the associated listed items.

It should be noted that in the specification, the expressions, such as "first," "second," and "third" are only used to distinguish one feature from another, rather than represent any limitations to the features. Thus, the first lens discussed below may also be referred to as the second lens or the third lens without departing from the teachings of the present disclosure.

In the accompanying drawings, the thicknesses, sizes and shapes of the lenses have been slightly exaggerated for the convenience of explanation. Specifically, shapes of spherical surfaces or aspheric surfaces shown in the accompanying drawings are shown by examples. That is, the shapes of the spherical surfaces or the aspheric surfaces are not limited to the shapes of the spherical surfaces or the aspheric surfaces shown in the accompanying drawings. The accompanying drawings are merely illustrative and not strictly drawn to scale.

Herein, the paraxial area refers to an area near the optical axis. If a surface of a lens is a convex surface and a position of the convex surface is not defined, it indicates that the surface of the lens is a convex surface at least in the paraxial area; and if a surface of a lens is a concave surface and a position of the concave surface is not defined, it indicates that the surface of the lens is a concave surface at least in the paraxial area. The surface closest to the object in each lens is referred to as the object-side surface, and the surface closest to the image plane in each lens is referred to as the image-side surface.

It should be further understood that the terms "comprising," "including," "having" and variants thereof, when used in the specification, specify the presence of stated features, elements and/or components, but do not exclude the presence or addition of one or more other features, elements, components and/or combinations thereof. In addition, expressions such as "at least one of," when preceding a list of listed features, modify the entire list of features rather than an individual element in the list. Further, the use of "may," when describing the implementations of the present disclosure, relates to "one or more implementations of the present disclosure." Also, the term "exemplary" is intended to refer to an example or illustration.

Unless otherwise defined, all terms (including technical and scientific terms) used herein have the same meaning as commonly understood by those of ordinary skill in the art to which the present disclosure belongs. It should be further understood that terms (i.e., those defined in commonly used dictionaries) should be interpreted as having a meaning that is consistent with their meaning in the context of the relevant art and will not be interpreted in an idealized or overly formal sense unless expressly so defined herein.

It should also be noted that the embodiments in the present disclosure and the features in the embodiments may be combined with each other on a non-conflict basis. The present disclosure will be described below in detail with reference to the accompanying drawings and in combination with the embodiments.

Features, principles, and other aspects of the present disclosure are described below in detail.

The optical imaging lens assembly according to exemplary implementations of the present disclosure includes, for example, five lenses (i.e., a first lens, a second lens, a third lens, a fourth lens, and a fifth lens) having refractive powers. The five lenses are arranged in sequence along an optical axis from an object side to an image side.

The first lens may have a positive refractive power, and an object-side surface of the first lens may be a convex surface. The second lens may have a negative refractive power, an object-side surface of the second lens may be a convex surface, and an image-side surface of the second lens may be a concave surface. The third lens may have a positive refractive power or a negative refractive power, and an image-side surface of the third lens may be a concave surface. The fourth lens may have a positive refractive power, an object-side surface of the fourth lens may be a concave surface, and an image-side surface of the fourth lens may be a convex surface. The fifth lens may have a negative refractive power, an object-side surface of the fifth lens may be a concave surface, and an image-side surface of the fifth lens may be a convex surface.

Alternatively, the third lens may have a negative refractive power.

An effective focal length f1 of the first lens and an effective focal length f2 of the second lens may satisfy: $-0.9<f1/f2<-0.5$, and more specifically, f1 and f2 may further satisfy: $-0.76 \le f1/f2 \le -0.59$. By constraining the ratio of the effective focal length f1 of the first lens to the effective focal length f2 of the second lens within a reasonable range, the residual aberration after the negative spherical aberration generated by the first lens and the positive spherical aberration generated by the second lens are balanced is controlled within a reasonable range, which benefits the subsequent lenses to balance the remaining spherical aberration of the system with a smaller burden. Thus, it helps to ensure the imaging quality near the on-axis field of view of the optical imaging lens assembly.

A combined refractive power of the first lens, the second lens, and the third lens may be a positive refractive power. A combined focal length f123 of the first lens, the second lens, and the third lens and a spacing distance T34 on the optical axis between the third lens and the fourth lens may satisfy: $3.5<f123/T34<7.0$, and more specifically, f123 and T34 may further satisfy: $3.82 \le f123/T34 \le 5.95$. By reasonably controlling the combined refractive power of the lenses and optimizing the spacing distance between the lenses, the good imaging quality of the optical imaging lens assembly may be ensured, and the optical imaging lens assembly may also have a good processibility.

A combined refractive power of the fourth lens and the fifth lens may be a negative refractive power. A total effective focal length f of the optical imaging lens assembly and a combined focal length f45 of the fourth lens and the fifth lens may satisfy: $-1.0<f/f45<-0.2$, and more specifically, f and f45 may further satisfy: $-0.62 \le f/f45 \le -0.29$. By constraining the ratio of the combined focal length f45 of the fourth lens and the fifth lens to the total effective focal length f of the optical imaging lens assembly, the fourth lens and the fifth lens can be combined as an optical member group having a reasonable negative refractive power, to balance the aberration generated by the front-end optical member group (including the first lens, the second lens, and the third lens) having a positive refractive power, thereby obtaining a good imaging quality.

An abbe number V4 of the fourth lens and an abbe number V5 of the fifth lens may satisfy: $|V4-V5|>20$, and more specifically, V4 and V5 may further satisfy: $32.30 \le |V4-V5| \le 35.40$. For the fourth lens and the fifth lens located near the image plane, materials having a large difference in the abbe numbers are selected as much as possible, to effectively correct the lateral chromatic aberration, the longitudinal chromatic aberration, and the sphero-chromatic aberration of the system, thereby ensuring the imaging quality of the system.

A radius of curvature R4 of the image-side surface of the second lens and a radius of curvature R3 of the object-side surface of the second lens may satisfy: $0<R4/R3 \le 0.5$, and more specifically, R4 and R3 may further satisfy: $0.10 \le R4/R3 \le 0.47$. By defining the range of the ratio of the radius of curvature R4 of the image-side surface of the second lens to the radius of curvature R3 of the object-side surface of the second lens, the shape of the second lens can be effectively controlled, and then the aberration contribution of the object-side surface of the second lens and the aberration contribution of the image-side surface of the second lens are effectively controlled. Accordingly, the aberration of the system that is related to the aperture band is effectively balanced, to improve the imaging quality of the lens assembly.

A radius of curvature R7 of the object-side surface of the fourth lens and a radius of curvature R10 of the image-side surface of the fifth lens may satisfy: $0<R7/R10<1.5$, and more specifically, R7 and R10 may further satisfy: $0.02 \le R7/R10 \le 1.31$. By controlling the range of the ratio of the radius of curvature R7 of the object-side surface of the fourth lens and the radius of curvature R10 of the image-side surface of the fifth lens, the comatic aberration contribution of the fourth lens and the comatic aberration contribution of the fifth lens can be controlled within a reasonable range, and thus the comatic aberration generated by each front-end lens can be well balanced, to obtain a good imaging quality.

The total effective focal length f of the optical imaging lens assembly and the radius of curvature R10 of the image-side surface of the fifth lens may satisfy: $-1.0<f/R10<0$, and more specifically, f and R10 may further satisfy: $-0.55 \le f/R10 \le -0.03$. By reasonably defining the radius of curvature R10 of the image-side surface of the fifth lens, the amount of astigmatism of the system can be effectively corrected, thereby ensuring the image quality at the edge field.

A spacing distance T12 on the optical axis between the first lens and the second lens may satisfy: $0.05 \text{ mm} \le T12 \le 0.5 \text{ mm}$, and more specifically, T12 may further satisfy: $0.06 \text{ mm} \le T12 \le 0.5 \text{ mm}$. By controlling the spacing distance T12 between the first lens and the second lens within a reasonable range, the petzval field curvature, the fifth-order spherical aberration, and the spherochromatism thereof can be easily balanced, so that the imaging system has a low system sensitivity while obtaining a good imaging quality, to better ensure the processibility of the imaging system.

A spacing distance T23 on the optical axis between the second lens and the third lens and a center thickness CT3 of the third lens on the optical axis may satisfy: $1<T23/C13<2.5$, and more specifically, T23 and CT3 may further satisfy: $1.20 \le T23/CT3 \le 2.43$. By constraining the ratio of the spacing distance T23 on the optical axis between the second lens and the third lens to the center thickness CT3 of the third lens on the optical axis within a reasonable range, the field curvature and the amount of distortion of the system can be effectively corrected, so that the off-axis field of the optical imaging lens assembly has a good imaging quality.

A total track length TTL of the optical imaging lens assembly (i.e., the distance on the optical axis from the center of the object-side surface of the first lens to the image plane of the optical imaging lens assembly) and the total effective focal length f of the optical imaging lens assembly may satisfy: $TTL/f<0.95$, and more specifically, TTL and f may further satisfy: $0.78 \le TTL/f \le 0.91$. Satisfying the conditional expression $TTL/f<0.95$ reflects the telephoto characteristics of the lens assembly.

In the exemplary implementations, the optical imaging lens assembly may also be provided with a diaphragm. The diaphragm may be disposed at any position between the object side and the image side as needed. An axial distance SL from the diaphragm to the image plane of the optical imaging lens assembly and the total track length TTL of the optical imaging lens assembly may satisfy: $SL/TTL \le 0.9$, and more specifically, SL and TTL may further satisfy: $0.70 \le SL/TTL \le 0.85$. By properly selecting the position of the diaphragm, the aberrations related to the diaphragm (e.g., the comatic aberration, the astigmatism, the distortion, and the longitudinal chromatic aberration) can be effectively corrected, to improve the imaging quality of the lens assembly. Alternatively, the diaphragm may be disposed between the first lens and the second lens. Alternatively, the diaphragm may be disposed between the second lens and the third lens.

Alternatively, the optical imaging lens assembly may further include an optical filter for correcting color deviations and/or a protective glass for protecting a photosensitive element on the image plane.

The optical imaging lens assembly may further include the photosensitive element disposed on the image plane, and half of a diagonal length of an effective pixel area of the photosensitive element is ImgH.

The optical imaging lens assembly according to the above implementations of the present disclosure may use a plurality of lenses, for example, the five lenses described above. By reasonably distributing the refractive powers and the surface types of the lenses, the center thicknesses of the lenses, the spacing distances on the axis between the lenses, etc., the sensitivity of the lens assembly may be effectively reduced, and the processibility of the lens assembly may be effectively enhanced, so that the optical imaging lens assembly is more conductive to the production and processing and applicable to the portable electronic produts. At the same time, the optical imaging lens assembly with the above configuration also has beneficial effects such as ultra-thin, miniaturization, telephoto, and high imaging quality.

In the implementations of the present disclosure, at least one of the surfaces of the lenses is an aspheric surface. The aspheric lens is characterized in that the curvature continuously changes from the center of the lens to the periphery. Different from a spherical lens having a constant curvature from the center of the lens to the periphery, the aspheric lens has a better radius-of-curvature characteristic, and has advantages of improving the distortion aberration and the astigmatic aberration. The use of the aspheric lens can eliminate as much as possible the aberrations that occur during the imaging, thereby improving the imaging quality.

However, it should be understood by those skilled in the art that the various results and advantages described in the present specification may be obtained by changing the number of the lenses constituting the optical imaging lens assembly without departing from the technical solution claimed by the present disclosure. For example, although the optical imaging lens assembly having five lenses is described as an example in the implementations, the optical imaging lens assembly is not limited to include five lenses. If desired, the optical imaging lens assembly may also include other numbers of lenses.

Specific embodiments of the optical imaging lens assembly that may be applied to the above implementations are further described below with reference to the accompanying drawings.

Embodiment 1

An optical imaging lens assembly according to Embodiment 1 of the present disclosure is described below with reference to FIGS. 1-2D. FIG. 1 is a schematic structural diagram illustrating the optical imaging lens assembly according to Embodiment 1 of the present disclosure.

As shown in FIG. 1, the optical imaging lens assembly includes, sequentially along an optical axis from an object side to an image side:

A first lens E1 having a positive refractive power, an object-side surface S1 of the first lens E1 is a convex surface, and an image-side surface S2 of the first lens E1 is a concave surface. The object-side surface S1 and the image-side surface S2 of the first lens E1 are both aspheric surfaces.

A second lens E2 having a negative refractive power, an object-side surface S3 of the second lens E2 is a convex surface, and an image-side surface S4 of the second lens E2 is a concave surface. The object-side surface S3 and the image-side surface S4 of the second lens E2 are both aspheric surfaces.

A third lens E3 having a negative refractive power, an object-side surface S5 of the third lens E3 is a convex surface, and an image-side surface S6 of the third lens E3 is a concave surface. The object-side surface S5 and the image-side surface S6 of the third lens E3 are both aspheric surfaces.

A fourth lens E4 having a positive negative refractive power, an object-side surface S7 of the fourth lens E4 is a concave surface, and an image-side surface S8 of the fourth lens E4 is a convex surface. The object-side surface S7 and the image-side surface S8 of the fourth lens E4 are both aspheric surfaces.

A fifth lens E5 having a negative refractive power, an object-side surface S9 of the fifth lens E5 is a concave surface, and an image-side surface S10 of the fifth lens E5 is a convex surface. The object-side surface S9 and the image-side surface S10 of the fifth lens E5 are both aspheric surfaces.

The optical imaging lens assembly may further include a photosensitive element disposed on an image plane S11. Light from an object sequentially passes through the surfaces S1-S10 and finally forms an image on the image plane S11.

Alternatively, a diaphragm STO for limiting light beams may be disposed between the first lens E1 and the second lens E2, to further improve the imaging quality of the optical imaging lens assembly.

Table 1 shows the surface type, the radius of curvature, the thickness, the material and the conic coefficient of each lens of the optical imaging lens assembly in Embodiment 1. The radius of curvature and the thickness are both shown in millimeters (mm).

TABLE 1

| surface number | surface type | radius of curvature | thickness | material refractive index | abbe number | conic coefficient |
|---|---|---|---|---|---|---|
| OBJ | spherical | infinite | infinite | | | |
| S1 | aspheric | 1.7535 | 1.0035 | 1.55 | 56.1 | 0.0954 |
| S2 | aspheric | 10.1043 | 0.4091 | | | −74.5808 |
| STO | spherical | infinite | 0.0918 | | | 0.0000 |
| S3 | aspheric | 27.8949 | 0.3000 | 1.67 | 20.4 | −99.0000 |
| S4 | aspheric | 2.9142 | 0.7297 | | | 1.4376 |
| S5 | aspheric | 15.7018 | 0.3000 | 1.55 | 56.1 | 92.7708 |
| S6 | aspheric | 14.1361 | 1.1714 | | | 95.7903 |
| S7 | aspheric | −18.8217 | 0.7365 | 1.67 | 20.4 | 84.5600 |
| S8 | aspheric | −4.3369 | 0.2173 | | | 0.7092 |
| S9 | aspheric | −2.2424 | 0.3600 | 1.54 | 55.8 | −0.3572 |
| S10 | aspheric | −14.4088 | 1.4307 | | | −99.0000 |
| S11 | spherical | infinite | | | | |

In this embodiment, the radius of curvature R4 of the image-side surface S4 of the second lens E2 and the radius of curvature R3 of the object-side surface S3 of the second lens E2 satisfy: R4/R3=0.10. The radius of curvature R7 of the object-side surface S7 of the fourth lens E4 and the radius of curvature R10 of the image-side surface S10 of the fifth lens E5 satisfy: R7/R10=1.31. The spacing distance T12 on the optical axis between the first lens E1 and the second lens E2 satisfies: T12=0.50 mm. The spacing distance T23 on the optical axis between the second lens E2 and the third lens E3 and the center thickness CT3 of the third lens E3 on the optical axis satisfy: T23/CT3=2.43. The axial distance SL from the diaphragm STO to the image plane S11 and the axial distance TTL from the object-side surface S1 of the first lens E1 to the image plane S11 satisfy: SL/TTL=0.79. The abbe number V4 of the fourth lens E4 and the abbe number V5 of the fifth lens E5 satisfy: |V4−V5|=35.40.

In Embodiment 1, each lens may be an aspheric lens. The surface type x of each aspheric surface is defined by the following formula:

$$x = \frac{ch^2}{1+\sqrt{1-(k+1)c^2h^2}} + \sum A_i h^i. \quad (1)$$

Here, x is the sag—the axis-component of the displacement of the surface from the aspheric vertex, when the surface is at height h from the optical axis; c is the paraxial curvature of the aspheric surface, and c=1/R (i.e., the paraxial curvature c is the reciprocal of the radius of curvature R in Table 1 above); k is the conic coefficient (given in Table 1); and Ai is the correction coefficient of the $i^{th}$ order of the aspheric surface. Table 2 below shows the high-order coefficients $A_4$, $A_6$, $A_8$, $A_{10}$, $A_{12}$, $A_{14}$, $A_{16}$, $A_{18}$, and $A_{20}$ applicable to the aspheric surfaces S1-S10 in Embodiment 1.

TABLE 3

| | \multicolumn{8}{c}{parameter} | | | | | | | |
|---|---|---|---|---|---|---|---|---|
| | f1 (mm) | f2 (mm) | f3 (mm) | f4 (mm) | f5 (mm) | f (mm) | TTL (mm) | ImgH (mm) |
| numerical value | 3.73 | −4.91 | −278.52 | 8.30 | −5.00 | 7.88 | 6.75 | 3.22 |

In this embodiment, the effective focal length f1 of the first lens E1 and the effective focal length f2 of the second lens E2 satisfy: f1/f2=−0.76. The axial distance TTL from the object-side surface S1 of the first lens E1 to the image plane S11 and the total effective focal length f of the optical imaging lens assembly satisfy: TTL/f=0.86. The total effective focal length f of the optical imaging lens assembly and the radius of curvature R10 of the image-side surface S10 of the fifth lens E5 satisfy: f/R10=−0.55. The combined focal length f123 of the first lens E1, the second lens E2, and the third lens E3 and the spacing distance T34 on the optical axis between the third lens E3 and the fourth lens E4 satisfy: f123/T34=5.95. The total effective focal length f of the optical imaging lens assembly and the combined focal length f45 of the fourth lens E4 and the fifth lens E5 satisfy: f/f45=−0.62.

Figure 2A:
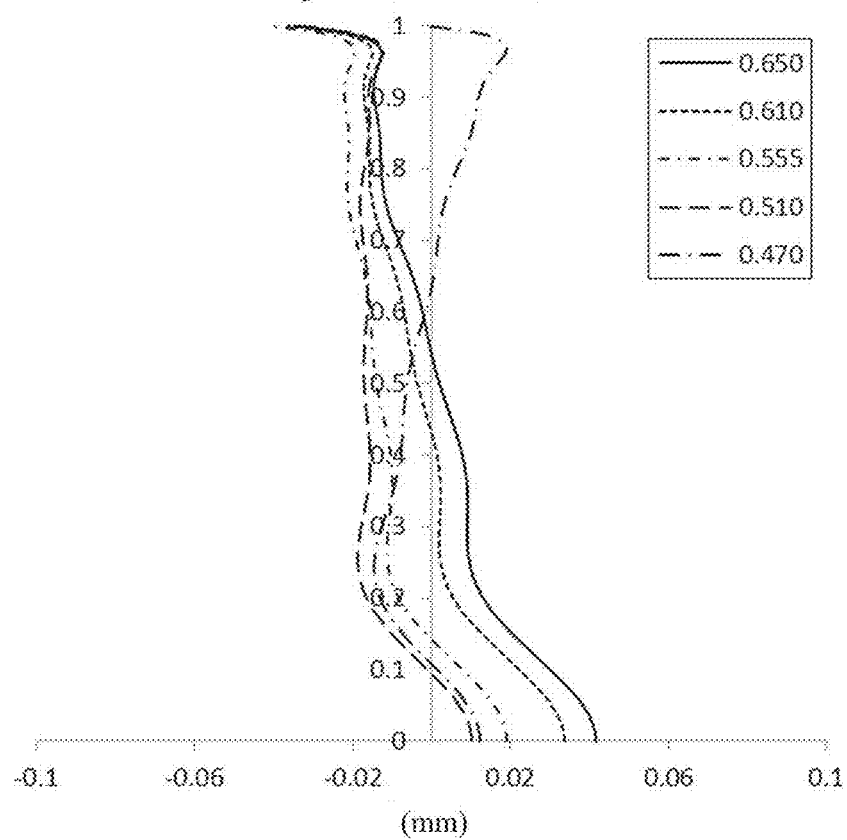
FIGS. 2A-2D respectively illustrate a longitudinal aberration curve, an astigmatic curve, a distortion curve, and a lateral color curve of the optical imaging lens assembly according to Embodiment 1.
Figure 2B:
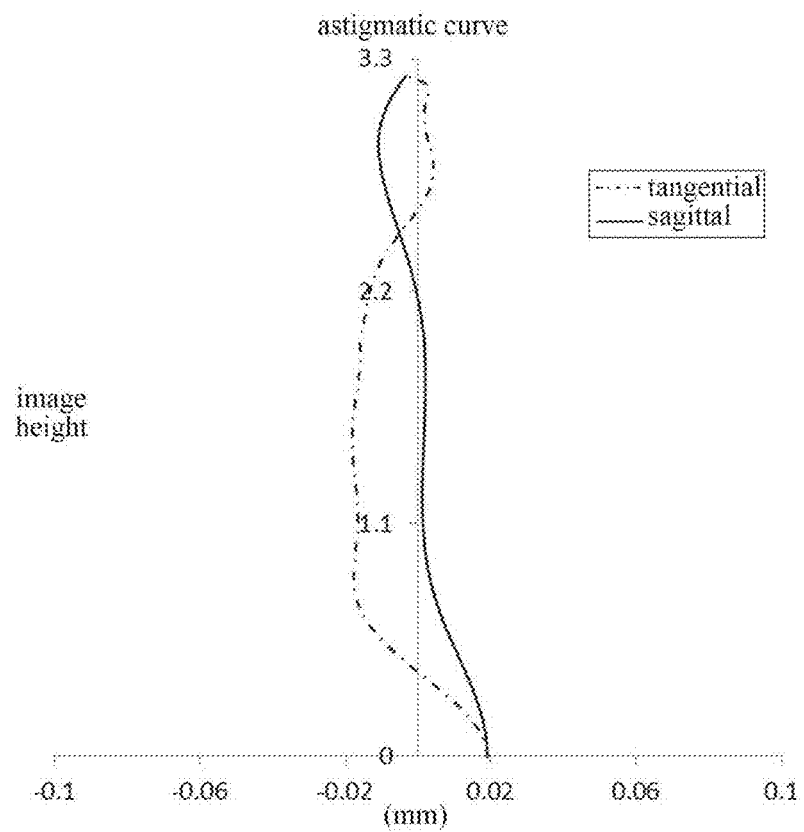
Figure 2C:
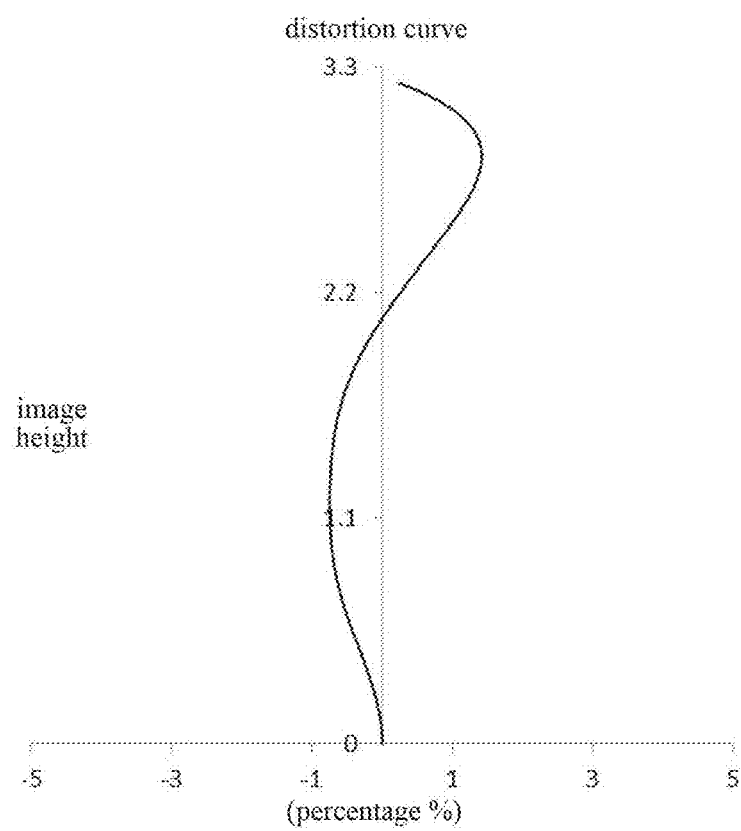
Figure 2D:
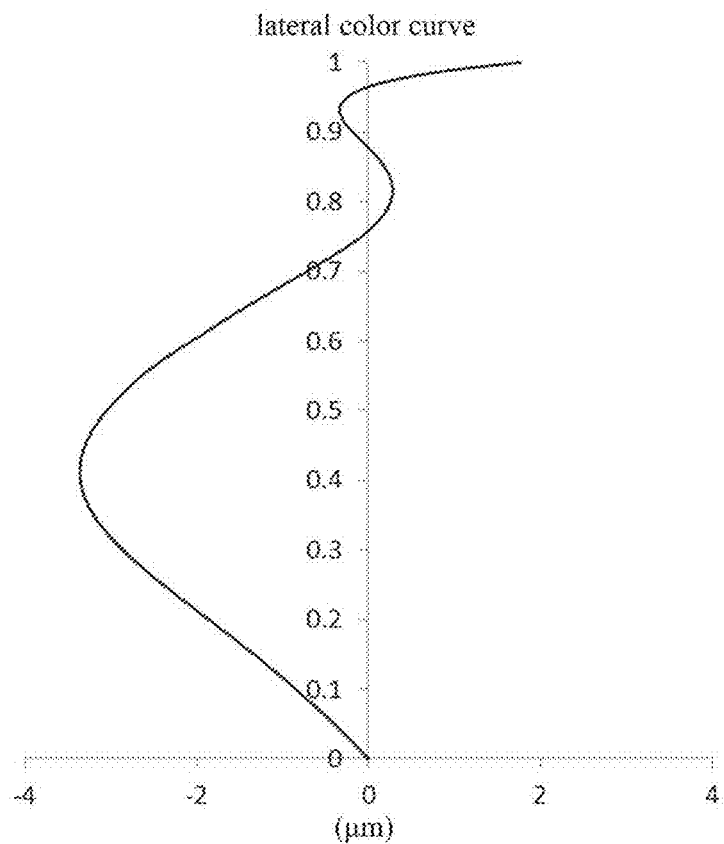

FIG. 2A illustrates the longitudinal aberration curve of the optical imaging lens assembly according to Embodiment 1, representing deviations of focal points of light of different wavelengths converged after passing through the lens assembly. FIG. 2B illustrates the astigmatic curve of the optical imaging lens assembly according to Embodiment 1, representing a curvature of the tangential image plane and a curvature of the sagittal image plane. FIG. 2C illustrates the

TABLE 2

| Surface number | A4 | A6 | A8 | A10 | A12 |
|---|---|---|---|---|---|
| S1 | −4.8962E−03 | −4.9012E−03 | 5.5928E−03 | −4.5256E−03 | −1.9745E−03 |
| S2 | −1.0810E−02 | 1.8089E−02 | −3.4203E−02 | 5.8716E−02 | −6.4742E−02 |
| S3 | −7.1771E−02 | 9.6127E−02 | 1.0776E−01 | −5.5149E−01 | 1.0994E+00 |
| S4 | −5.3256E−02 | 2.5951E−01 | −8.0633E−01 | 3.4990E+00 | −1.0157E+01 |
| S5 | −4.0028E−02 | 1.0687E−01 | −2.5850E−01 | 9.7551E−01 | −2.3031E+00 |
| S6 | −2.4698E−02 | 1.5449E−01 | −4.5482E−01 | 1.2306E+00 | −2.1663E+00 |
| S7 | 1.1933E−02 | −5.8809E−02 | 9.2867E−02 | −8.4320E−02 | 4.7333E−02 |
| S8 | 6.8204E−02 | −1.5255E−01 | 1.5148E−01 | −9.3315E−02 | 3.6177E−02 |
| S9 | 8.1896E−02 | −1.6082E−01 | 1.7353E−01 | −1.0894E−01 | 4.3988E−02 |
| S10 | −4.0216E−02 | 2.7196E−02 | −1.3799E−02 | 7.9070E−03 | −3.3696E−03 |

| Surface number | A14 | A16 | A18 | A20 |
|---|---|---|---|---|
| S1 | 5.7671E−03 | −4.2334E−03 | 1.4092E−03 | −1.8616E−04 |
| S2 | 4.4847E−02 | −1.9053E−02 | 4.5431E−03 | −4.6873E−04 |
| S3 | −1.3476E+00 | 1.0136E+00 | −4.2566E−01 | 7.6128E−02 |
| S4 | 1.8640E+01 | −2.0908E+01 | 1.3103E+01 | −3.5106E+00 |
| S5 | 3.2578E+00 | −2.7556E+00 | 1.2889E+00 | −2.5641E−01 |
| S6 | 2.3982E+00 | −1.6320E+00 | 6.2411E−01 | −1.0246E−01 |
| S7 | −1.6437E−02 | 3.4680E−03 | −4.1107E−04 | 2.1120E−05 |
| S8 | −8.5480E−03 | 1.1872E−03 | −8.9380E−05 | 2.8397E−06 |
| S9 | −1.1401E−02 | 1.8210E−03 | −1.6277E−04 | 6.2219E−06 |
| S10 | 8.8016E−04 | −1.3542E−04 | 1.1363E−05 | −4.0217E−07 |

Table 3 shows the effective focal lengths f1-f5 of the lenses in Embodiment 1, the total effective focal length f of the optical imaging lens assembly, the total track length TTL (i.e., the distance on the optical axis from the center of the object-side surface S1 of the first lens E1 to the image plane S11) of the optical imaging lens assembly, and the half of the diagonal length ImgH of the effective pixel area on the image plane S11 of the optical imaging lens assembly.

distortion curve of the optical imaging lens assembly according to Embodiment 1, representing amounts of distortion at different viewing angles. FIG. 2D illustrates the lateral color curve of the optical imaging lens assembly according to Embodiment 1, representing deviations of different image heights on the image plane after light passes through the lens assembly. It can be seen from FIGS. 2A-2D that the optical imaging lens assembly according to Embodiment 1 can achieve a good imaging quality.

Embodiment 2

Figure 3:
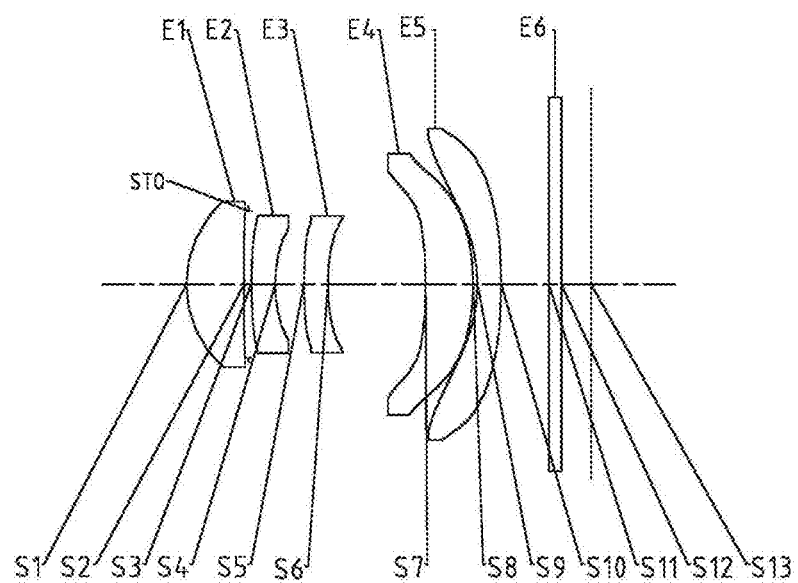
FIG. 3 is a schematic structural diagram illustrating an optical imaging lens assembly according to Embodiment 2 of the present disclosure.

An optical imaging lens assembly according to Embodiment 2 of the present disclosure is described below with reference to FIGS. 3-4D. In this embodiment and the following embodiments, for the purpose of brevity, the description of parts similar to those in Embodiment 1 will be omitted. FIG. 3 is a schematic structural diagram illustrating the optical imaging lens assembly according to Embodiment 2 of the present disclosure.

As shown in FIG. 3, the optical imaging lens assembly includes, sequentially along an optical axis from an object side to an image side:

A first lens E1 having a positive refractive power, an object-side surface S1 of the first lens E1 is a convex surface, and an image-side surface S2 of the first lens E1 is a convex surface. The object-side surface S1 and the image-side surface S2 of the first lens E1 are both aspheric surfaces.

A second lens E2 having a negative refractive power, an object-side surface S3 of the second lens E2 is a convex surface, and an image-side surface S4 of the second lens E2 is a concave surface. The object-side surface S3 and the image-side surface S4 of the second lens E2 are both aspheric surfaces.

A third lens E3 having a negative refractive power, an object-side surface S5 of the third lens E3 is a convex surface, and an image-side surface S6 of the third lens E3 is a concave surface. The object-side surface S5 and the image-side surface S6 of the third lens E3 are both aspheric surfaces.

A fourth lens E4 having a positive refractive power, an object-side surface S7 of the fourth lens E4 is a concave surface, and an image-side surface S8 of the fourth lens E4 is a convex surface. The object-side surface S7 and the image-side surface S8 of the fourth lens E4 are both aspheric surfaces.

A fifth lens E5 having a negative refractive power, an object-side surface S9 of the fifth lens E5 is a concave surface, and an image-side surface S10 of the fifth lens E5 is a convex surface. The object-side surface S9 and the image-side surface S10 of the fifth lens E5 are both aspheric surfaces.

The optical imaging lens assembly may further include a photosensitive element disposed on an image plane S13. Alternatively, an optical filter E6 having an object-side surface S11 and an image-side surface S12 may be disposed between the fifth lens E5 and the image plane S13. Light from an object sequentially passes through the surfaces S1-S12 and finally forms an image on the image plane S13.

Alternatively, a diaphragm STO for limiting light beams may be disposed between the first lens E1 and the second lens E2, to further improve the imaging quality of the lens assembly.

Table 4 shows the surface type, the radius of curvature, the thickness, the material and the conic coefficient of each lens of the optical imaging lens assembly in Embodiment 2. The radius of curvature and the thickness are shown in millimeters (mm). Table 5 shows the high-order coefficients applicable to each aspheric surface in Embodiment 2. The surface type of each aspheric surface may be defined by the formula (1) given in Embodiment 1. Table 6 shows the effective focal lengths f1-f5 of the lenses in Embodiment 2, the total effective focal length f of the optical imaging lens assembly, the total track length TTL of the optical imaging lens assembly, and the half of the diagonal length ImgH of the effective pixel area on the image plane S13 of the optical imaging lens assembly.

TABLE 4

| surface number | surface type | radius of curvature | thickness | material refractive index | abbe number | conic coefficient |
|---|---|---|---|---|---|---|
| OBJ | spherical | infinite | infinite | | | |
| S1 | aspheric | 1.8714 | 0.9694 | 1.55 | 56.1 | 0.0409 |
| S2 | aspheric | −40.0058 | 0.0698 | | | −87.7760 |
| STO | spherical | infinite | 0.0500 | | | 0.0000 |
| S3 | aspheric | 6.6828 | 0.4000 | 1.67 | 20.4 | 21.3167 |
| S4 | aspheric | 2.3452 | 0.4809 | | | 0.6433 |
| S5 | aspheric | 9.3343 | 0.4000 | 1.55 | 56.1 | 29.9566 |
| S6 | aspheric | 4.0260 | 1.6352 | | | 7.0259 |
| S7 | aspheric | −11.3789 | 0.7990 | 1.65 | 23.5 | −61.8388 |
| S8 | aspheric | −3.7108 | 0.0699 | | | −1.7109 |
| S9 | aspheric | −2.8149 | 0.4000 | 1.54 | 55.8 | −0.0400 |
| S10 | aspheric | −16.7246 | 0.7957 | | | 26.7262 |
| S11 | spherical | infinite | 0.2100 | 1.52 | 64.2 | |
| S12 | spherical | infinite | 0.4992 | | | |
| S13 | spherical | infinite | | | | |

TABLE 5

| surface number | A4 | A6 | A8 | A10 | A12 |
|---|---|---|---|---|---|
| S1 | 6.6171E−04 | −1.3191E−02 | 4.0959E−02 | −7.7354E−02 | 9.0501E−02 |
| S2 | −3.6705E−02 | 1.2844E−01 | −2.1753E−01 | 2.8999E−01 | −2.8373E−01 |
| S3 | −8.8908E−02 | 1.7339E−01 | −1.7933E−01 | 7.6863E−02 | 1.1285E−01 |
| S4 | −6.5448E−02 | 2.1783E−01 | −5.5997E−01 | 1.7314E+00 | −3.7716E+00 |
| S5 | 1.4436E−03 | −2.0642E−01 | 2.3910E−01 | −7.0846E−01 | 1.2303E+00 |
| S6 | 1.2345E−02 | 6.5135E−02 | −1.9712E−01 | 5.6888E−01 | −1.0678E+00 |
| S7 | −1.1946E−02 | −3.2025E−02 | 3.2834E−02 | −3.1370E−02 | 1.9821E−02 |
| S8 | 2.3045E−02 | −8.3552E−02 | 8.1373E−02 | −4.8232E−02 | 1.8161E−02 |
| S9 | −2.1712E−02 | −1.9177E−02 | 5.1266E−02 | −3.5091E−02 | 1.2697E−02 |
| S10 | −6.8065E−02 | 5.1696E−02 | −2.4561E−02 | 7.4770E−03 | −1.4506E−03 |

| surface number | A14 | A16 | A18 | A20 |
|---|---|---|---|---|
| S1 | −6.6421E−02 | 2.9889E−02 | −7.5395E−03 | 8.2176E−04 |
| S2 | 1.9128E−01 | −8.2735E−02 | 2.0471E−02 | −2.1775E−03 |
| S3 | −2.4429E−01 | 2.0484E−01 | −8.5160E−02 | 1.4376E−02 |
| S4 | 5.3596E+00 | −4.7019E+00 | 2.3069E+00 | −4.8379E−01 |
| S5 | −1.3252E+00 | 8.5873E−01 | −3.0572E−01 | 4.5641E−02 |
| S6 | 1.2509E+00 | −8.8995E−01 | 3.5050E−01 | −5.8637E−02 |
| S7 | −8.0807E−03 | 1.9573E−03 | −2.3899E−04 | 1.0458E−05 |
| S8 | −4.4688E−03 | 6.9131E−04 | −5.8920E−05 | 2.0142E−06 |

TABLE 5-continued

| | | | | |
|---|---|---|---|---|
| S9 | −2.7202E−03 | 3.4693E−04 | −2.4375E−05 | 7.2640E−07 |
| S10 | 1.5900E−04 | −6.3768E−06 | −3.6895E−07 | 3.3590E−08 |

TABLE 6

| | parameter | | | | | | |
|---|---|---|---|---|---|---|---|
| | f1 (mm) | f2 (mm) | f3 (mm) | f4 (mm) | f5 (mm) | f (mm) | TTL (mm) | ImgH (mm) |
| numerical value | 3.30 | −5.64 | −13.32 | 8.22 | −6.37 | 7.48 | 5.27 | 2.39 |

Figure 4A:
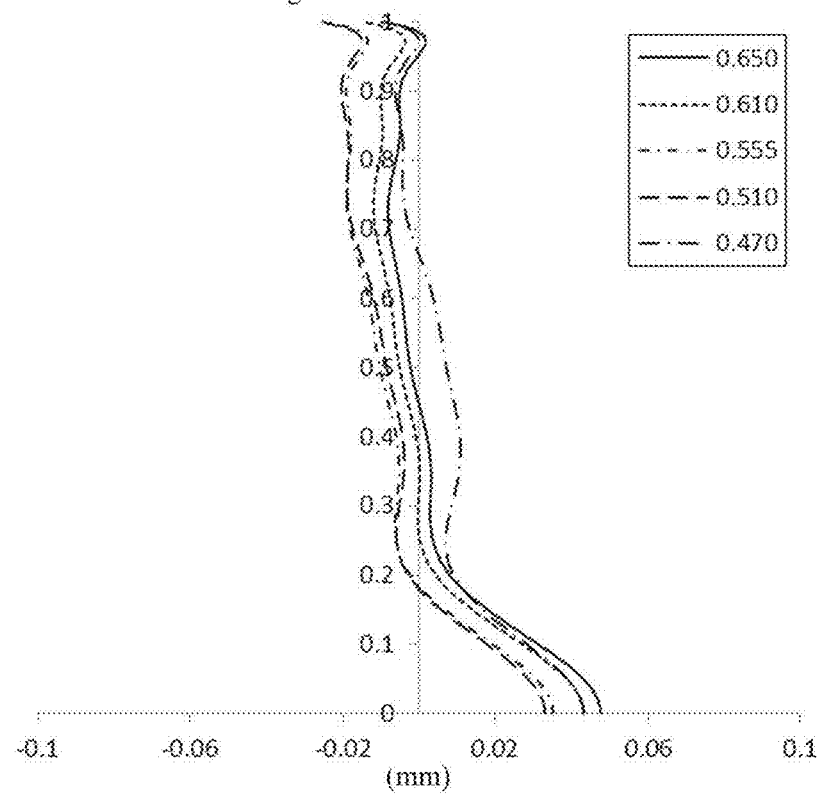
FIGS. 4A-4D respectively illustrate a longitudinal aberration curve, an astigmatic curve, a distortion curve, and a lateral color curve of the optical imaging lens assembly according to Embodiment 2.
Figure 4B:
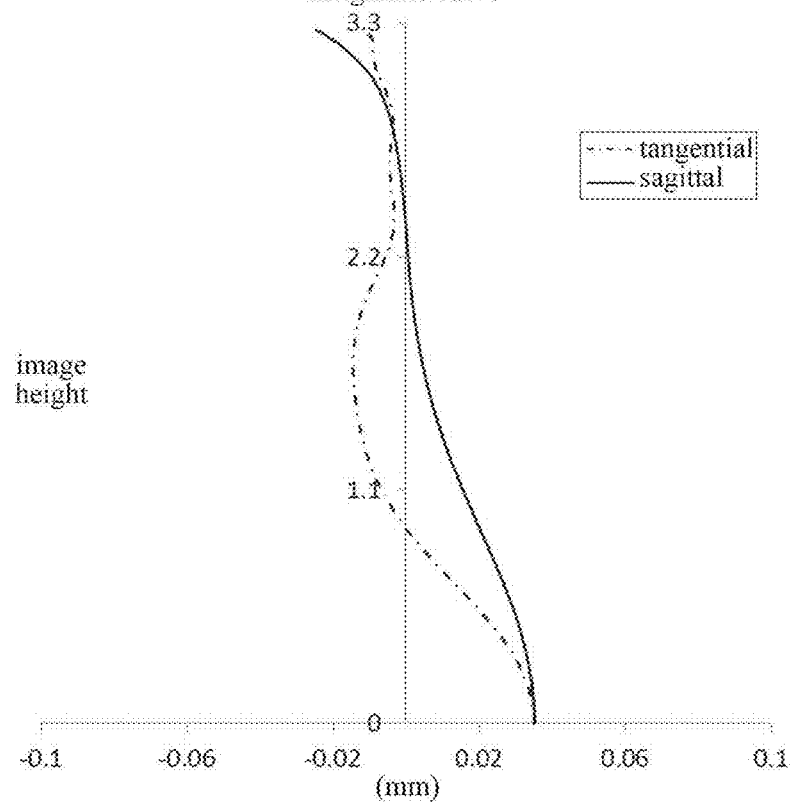
Figure 4C:
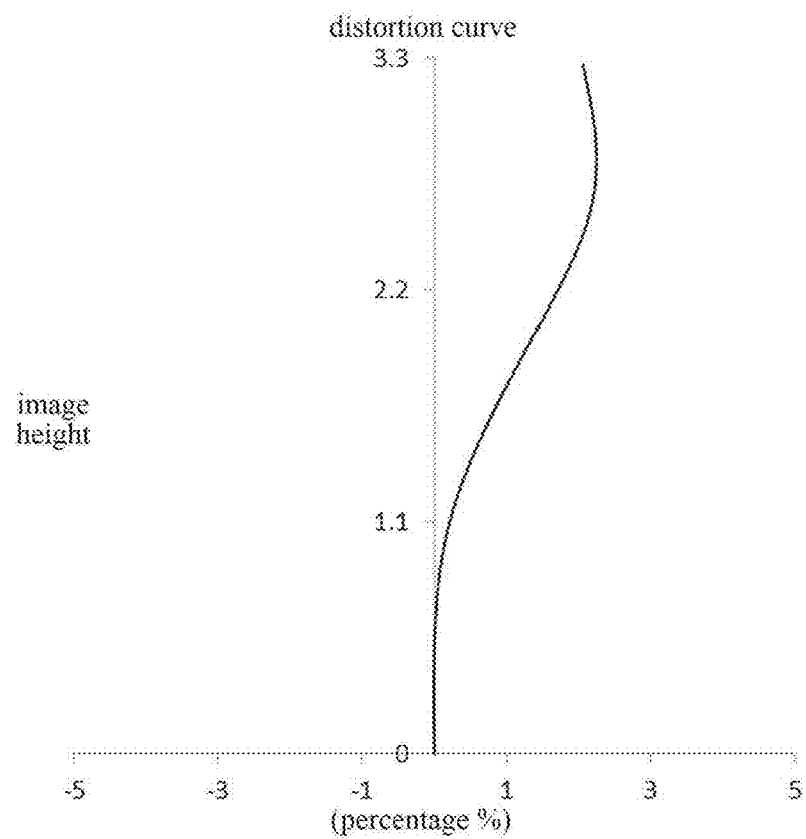
Figure 4D:
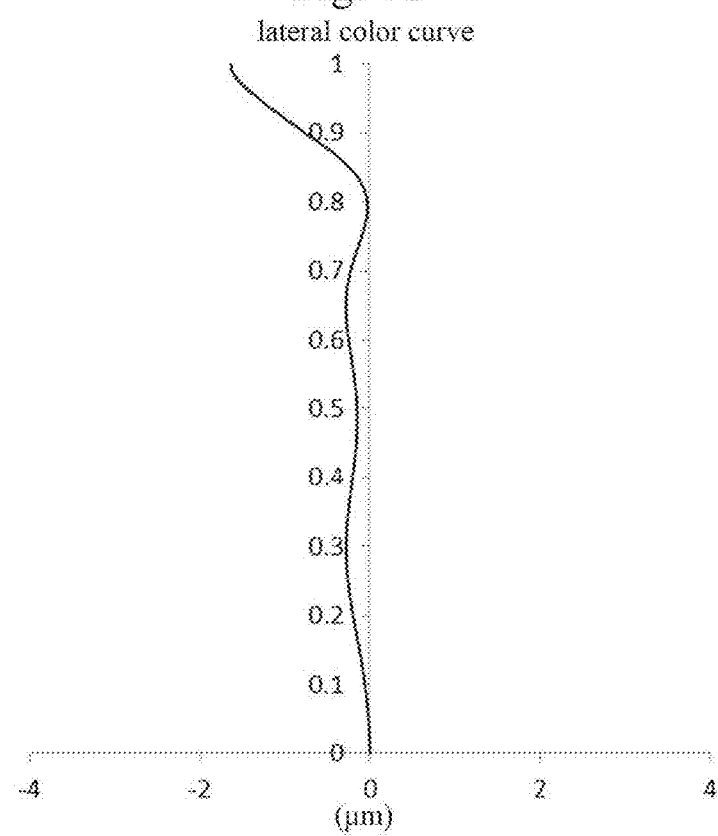

FIG. 4A illustrates the longitudinal aberration curve of the optical imaging lens assembly according to Embodiment 2, representing deviations of focal points of light of different wavelengths converged after passing through the lens assembly. FIG. 4B illustrates the astigmatic curve of the optical imaging lens assembly according to Embodiment 2, representing a curvature of the tangential image plane and a curvature of the sagittal image plane. FIG. 4C illustrates the distortion curve of the optical imaging lens assembly according to Embodiment 2, representing amounts of distortion at different viewing angles. FIG. 4D illustrates the lateral color curve of the optical imaging lens assembly according to Embodiment 2, representing deviations of different image heights on the image plane after light passes through the lens assembly. It can be seen from FIGS. 4A-4D that the optical imaging lens assembly according to Embodiment 2 can achieve a good imaging quality.

Embodiment 3

Figure 5:
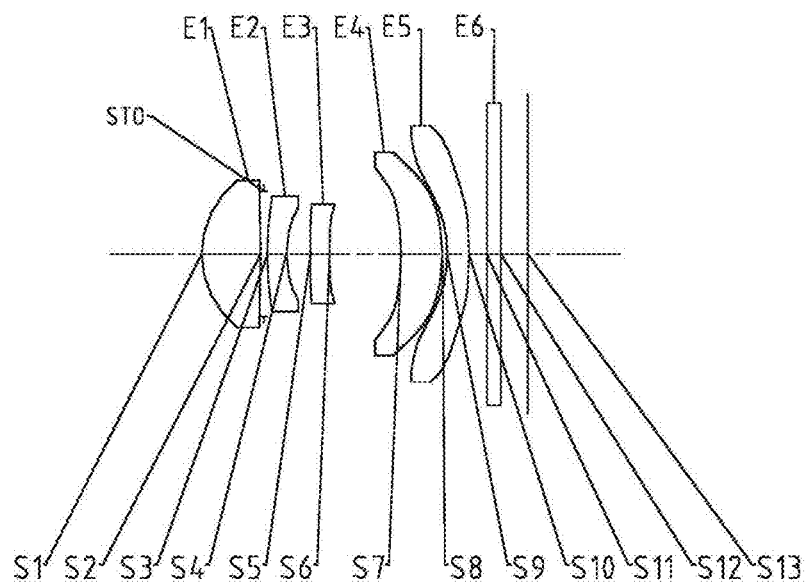
FIG. 5 is a schematic structural diagram illustrating an optical imaging lens assembly according to Embodiment 3 of the present disclosure.

An optical imaging lens assembly according to Embodiment 3 of the present disclosure is described below with reference to FIGS. 5-6D. FIG. 5 is a schematic structural diagram illustrating the optical imaging lens assembly according to Embodiment 3 of the present disclosure.

As shown in FIG. 5, the optical imaging lens assembly includes, sequentially along an optical axis from an object side to an image side:

A first lens E1 having a positive refractive power, an object-side surface S1 of the first lens E1 is a convex surface, and an image-side surface S2 of the first lens E1 is a convex surface. The object-side surface S1 and the image-side surface S2 of the first lens E1 are both aspheric surfaces.

A second lens E2 having a negative refractive power, an object-side surface S3 of the second lens E2 is a convex surface, and an image-side surface S4 of the second lens E2 is a concave surface. The object-side surface S3 and the image-side surface S4 of the second lens E2 are both aspheric surfaces.

A third lens E3 having a negative refractive power, an object-side surface S5 of the third lens E3 is a concave surface, and an image-side surface S6 of the third lens E3 is a concave surface. The object-side surface S5 and the image-side surface S6 of the third lens E3 are both aspheric surfaces.

A fourth lens E4 having a positive refractive power, an object-side surface S7 of the fourth lens E4 is a concave surface, and an image-side surface S8 of the fourth lens E4 is a convex surface. The object-side surface S7 and the image-side surface S8 of the fourth lens E4 are both aspheric surfaces.

A fifth lens E5 having a negative refractive power, an object-side surface S9 of the fifth lens E5 is a concave surface, and an image-side surface S10 of the fifth lens E5 is a convex surface. The object-side surface S9 and the image-side surface S10 of the fifth lens E5 are both aspheric surfaces.

The optical imaging lens assembly may further include a photosensitive element disposed on an image plane S13. Alternatively, an optical filter E6 having an object-side surface S11 and an image-side surface S12 may be disposed between the fifth lens E5 and the image plane S13. Light from an object sequentially passes through the surfaces S1-S12 and finally forms an image on the image plane S13.

Alternatively, a diaphragm STO for limiting light beams may be disposed between the first lens E1 and the second lens E2, to further improve the imaging quality of the lens assembly.

Table 7 shows the surface type, the radius of curvature, the thickness, the material and the conic coefficient of each lens of the optical imaging lens assembly in Embodiment 3. The radius of curvature and the thickness are shown in millimeters (mm). Table 8 shows the high-order coefficients applicable to each aspheric surface in Embodiment 3. The surface type of each aspheric surface may be defined by the formula (1) given in Embodiment 1. Table 9 shows the effective focal lengths f1-f5 of the lenses in Embodiment 3, the total effective focal length f of the optical imaging lens assembly, the total track length TTL of the optical imaging lens assembly, and the half of the diagonal length ImgH of the effective pixel area on the image plane S11 of the optical imaging lens assembly.

TABLE 7

| | | | | material | | |
|---|---|---|---|---|---|---|
| surface number | surface type | radius of curvature | thickness | refractive index | abbe number | conic coefficient |
| OBJ | spherical | infinite | infinite | | | |
| S1 | aspheric | 1.3849 | 0.8965 | 1.55 | 56.1 | −0.0862 |
| S2 | aspheric | −18.2880 | 0.0500 | | | −99.0000 |
| STO | spherical | infinite | 0.0500 | | | 0.0000 |
| S3 | aspheric | 4.2124 | 0.2900 | 1.67 | 20.4 | 12.8084 |
| S4 | aspheric | 1.5215 | 0.3637 | | | −0.2632 |
| S5 | aspheric | −7.9544 | 0.2900 | 1.55 | 56.1 | −56.9982 |
| S6 | aspheric | 56.7679 | 1.0852 | | | −99.0000 |
| S7 | aspheric | −3.6307 | 0.6296 | 1.65 | 23.5 | −1.1455 |
| S8 | aspheric | −2.0720 | 0.0713 | | | −1.9226 |
| S9 | aspheric | −2.1220 | 0.3300 | 1.54 | 55.8 | −0.1848 |
| S10 | aspheric | −200.0000 | 0.2739 | | | −99.0000 |
| S11 | spherical | infinite | 0.2100 | 1.52 | 64.2 | |
| S12 | spherical | infinite | 0.4087 | | | |
| S13 | spherical | infinite | | | | |

TABLE 8

| surface number | A4 | A6 | A8 | A10 | A12 |
|---|---|---|---|---|---|
| S1 | 2.7290E−03 | −2.3524E−02 | 7.7463E−02 | −1.4223E−01 | 1.2039E−01 |
| S2 | −9.5928E−02 | 5.1921E−01 | −1.4611E+00 | 2.9001E+00 | −4.0019E+00 |
| S3 | −2.6657E−01 | 8.1191E−01 | −1.7266E+00 | 2.4275E+00 | −1.4001E+00 |
| S4 | −1.9622E−01 | 1.4733E+00 | −1.1164E+01 | 7.7842E+01 | −3.5330E+02 |
| S5 | 1.5881E−01 | −8.9899E−01 | 1.2631E+01 | −9.1340E+01 | 4.0625E+02 |
| S6 | 1.6386E−01 | 1.0113E+00 | −1.0338E+01 | 6.7525E+01 | −2.7552E+02 |
| S7 | 8.6654E−02 | −4.0502E−01 | 9.0661E−01 | −1.4108E+00 | 1.3105E+00 |
| S8 | 2.6348E−01 | −8.1129E−01 | 1.1841E+00 | −1.1208E+00 | 6.5740E−01 |
| S9 | 3.0139E−02 | −4.3370E−01 | 8.6471E−01 | −8.6615E−01 | 5.3891E−01 |
| S10 | −3.3601E−01 | 4.3702E−01 | −4.4737E−01 | 3.7817E−01 | −2.2474E−01 |

| surface number | A14 | A16 | A18 | A20 |
|---|---|---|---|---|
| S1 | −6.1759E−04 | −8.5560E−02 | 6.4124E−02 | −1.5825E−02 |
| S2 | 3.6383E+00 | −2.0282E+00 | 6.0573E−01 | −6.9391E−02 |
| S3 | −2.0052E+00 | 4.8450E+00 | −3.9243E+00 | 1.1834E+00 |
| S4 | 1.0130E+03 | −1.7676E+03 | 1.7142E+03 | −7.0768E+02 |
| S5 | −1.1375E+03 | 1.9534E+03 | −1.8806E+03 | 7.7802E+02 |
| S6 | 7.0096E+02 | −1.0814E+03 | 9.2480E+02 | −3.3616E+02 |
| S7 | −6.9698E−01 | 1.8156E−01 | −6.9644E−03 | −4.1318E−03 |
| S8 | −2.2339E−01 | 3.7640E−02 | −1.3217E−03 | −2.6811E−04 |
| S9 | −2.1332E−01 | 5.1913E−02 | −7.0607E−03 | 4.1003E−04 |
| S10 | 8.5307E−02 | −1.9601E−02 | 2.4876E−03 | −1.3418E−04 |

TABLE 9

| | parameter | | | | | | | |
|---|---|---|---|---|---|---|---|---|
| | f1 (mm) | f2 (mm) | f3 (mm) | f4 (mm) | f5 (mm) | f (mm) | TTL (mm) | ImgH (mm) |
| Numerical value | 2.40 | −3.74 | −12.76 | 6.48 | −4.00 | 5.56 | 4.95 | 2.42 |

Figure 6A:
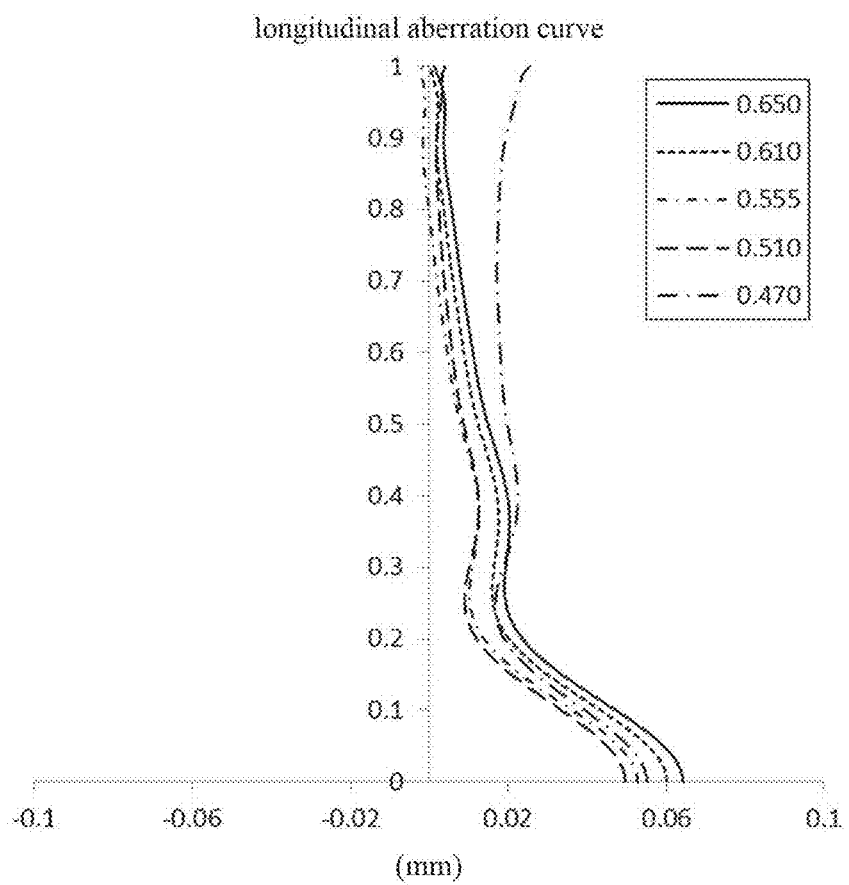
FIGS. 6A-6D respectively illustrate a longitudinal aberration curve, an astigmatic curve, a distortion curve, and a lateral color curve of the optical imaging lens assembly according to Embodiment 3.
Figure 6B:
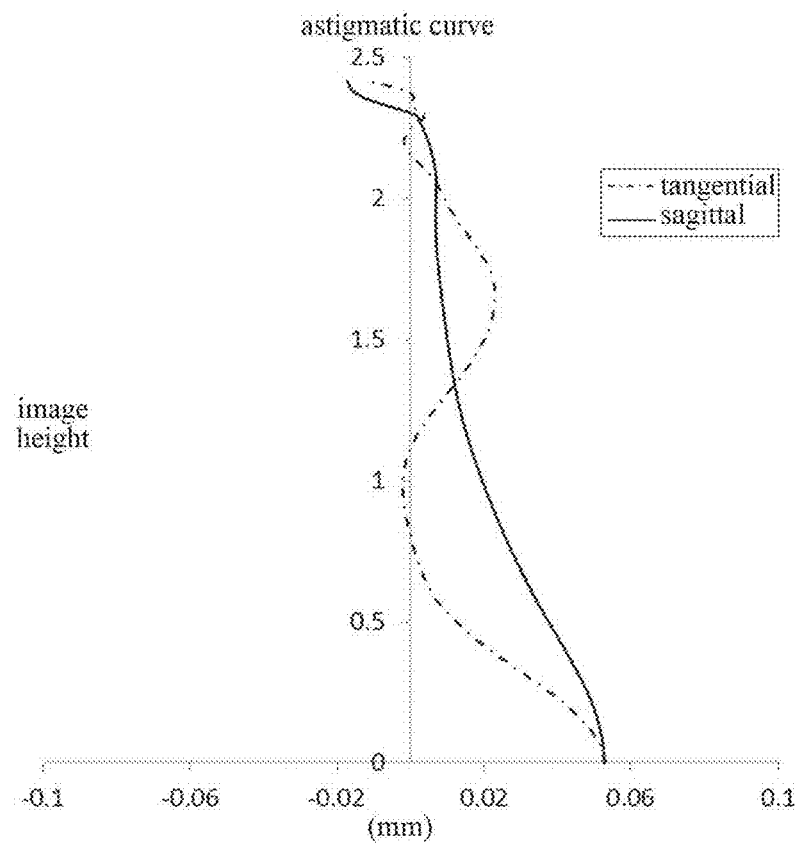
Figure 6C:
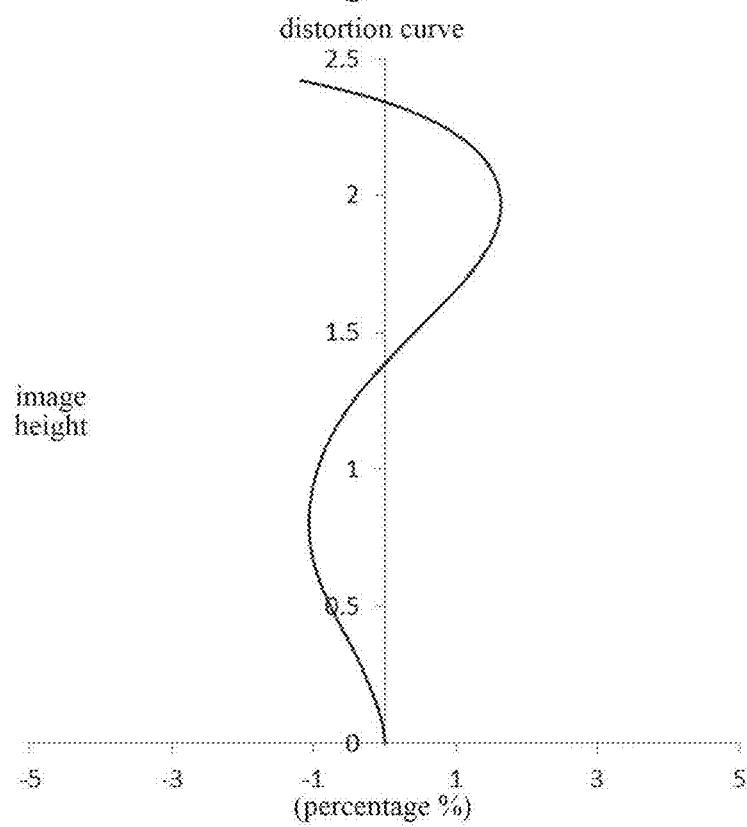
Figure 6D:
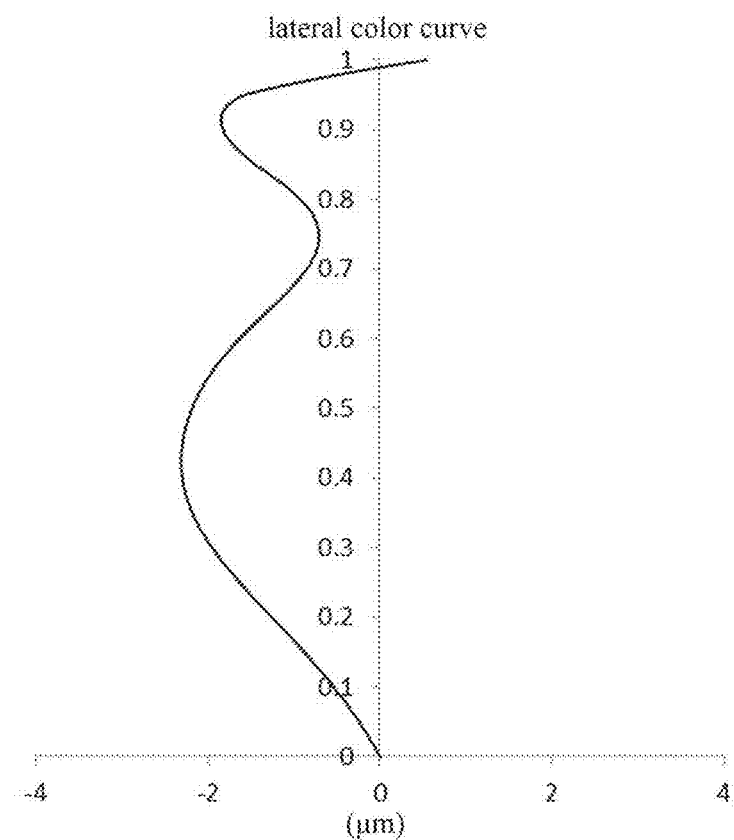

FIG. 6A illustrates the longitudinal aberration curve of the optical imaging lens assembly according to Embodiment 3, representing deviations of focal points of light of different wavelengths converged after passing through the lens assembly. FIG. 6B illustrates the astigmatic curve of the optical imaging lens assembly according to Embodiment 3, representing a curvature of the tangential image plane and a curvature of the sagittal image plane. FIG. 6C illustrates the distortion curve of the optical imaging lens assembly according to Embodiment 3, representing amounts of distortion at different viewing angles. FIG. 6D illustrates the lateral color curve of the optical imaging lens assembly according to Embodiment 3, representing deviations of different image heights on the image plane after light passes through the lens assembly. It can be seen from FIGS. 6A-6D that the optical imaging lens assembly according to Embodiment 3 can achieve a good imaging quality.

Embodiment 4

Figure 7:
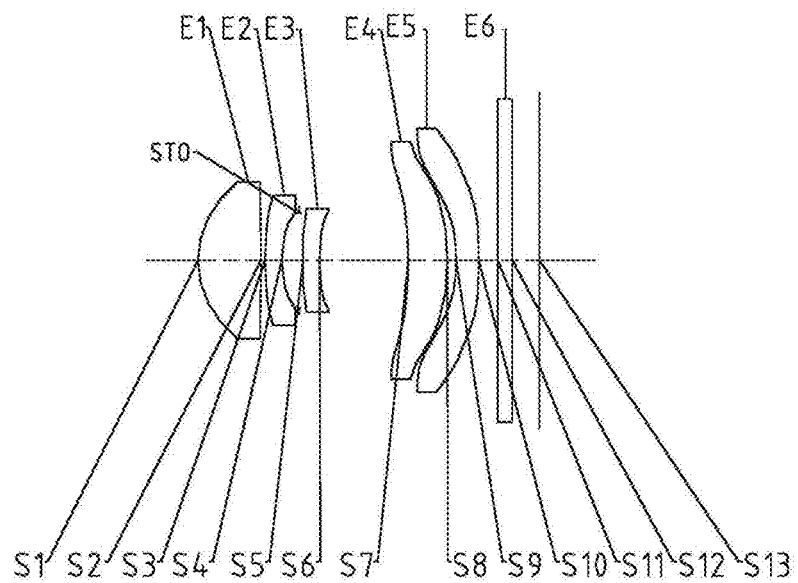
FIG. 7 is a schematic structural diagram illustrating an optical imaging lens assembly according to Embodiment 4 of the present disclosure.

An optical imaging lens assembly according to Embodiment 4 of the present disclosure is described below with reference to FIGS. 7-8D. FIG. 7 is a schematic structural diagram illustrating the optical imaging lens assembly according to Embodiment 4 of the present disclosure.

As shown in FIG. 7, the optical imaging lens assembly includes, sequentially along an optical axis from an object side to an image side:

A first lens E1 having a positive refractive power, an object-side surface S1 of the first lens E1 is a convex surface, and an image-side surface S2 of the first lens E1 is a convex surface. The object-side surface S1 and the image-side surface S2 of the first lens E1 are both aspheric surfaces.

A second lens E2 having a negative refractive power, an object-side surface S3 of the second lens E2 is a convex surface, and an image-side surface S4 of the second lens E2 is a concave surface. The object-side surface S3 and the image-side surface S4 of the second lens E2 are both aspheric surfaces.

A third lens E3 having a negative refractive power, an object-side surface S5 of the third lens E3 is a concave surface, and an image-side surface S6 of the third lens E3 is a concave surface. The object-side surface S5 and the image-side surface S6 of the third lens E3 are both aspheric surfaces.

A fourth lens E4 having a positive refractive power, an object-side surface S7 of the fourth lens E4 is a concave surface, and an image-side surface S8 of the fourth lens E4 is a convex surface. The object-side surface S7 and the image-side surface S8 of the fourth lens E4 are both aspheric surfaces.

A fifth lens E5 having a negative refractive power, an object-side surface S9 of the fifth lens E5 is a concave surface, and an image-side surface S10 of the fifth lens E5 is a convex surface. The object-side surface S9 and the image-side surface S10 of the fifth lens E5 are both aspheric surfaces.

The optical imaging lens assembly may further include a photosensitive element disposed on an image plane S13. Alternatively, an optical filter E6 having an object-side surface S11 and an image-side surface S12 may be disposed between the fifth lens E5 and the image plane S13. Light from an object sequentially passes through the surfaces S1-S12 and finally forms an image on the image plane S13.

Alternatively, a diaphragm STO for limiting light beams may be disposed between the second lens E2 and the third lens E3, to further improve the imaging quality of the lens assembly.

Table 10 shows the surface type, the radius of curvature, the thickness, the material and the conic coefficient of each lens of the optical imaging lens assembly in Embodiment 4. The radius of curvature and the thickness are shown in millimeters (mm). Table 11 shows the high-order coefficients applicable to each aspheric surface in Embodiment 4. The surface type of each aspheric surface may be defined by the formula (1) given in Embodiment 1. Table 12 shows the effective focal lengths f1-f5 of the lenses in Embodiment 4, the total effective focal length f of the optical imaging lens assembly, the total track length TTL of the optical imaging lens assembly, and the half of the diagonal length ImgH of the effective pixel area on the image plane S13 of the optical imaging lens assembly.

TABLE 10

| surface number | surface type | radius of curvature | thickness | material refractive index | abbe number | conic coefficient |
|---|---|---|---|---|---|---|
| OBJ | spherical | infinite | infinite | | | |
| S1 | aspheric | 1.3574 | 0.9130 | 1.55 | 56.1 | 0.1415 |
| S2 | aspheric | −9.3705 | 0.0600 | | | −16.3201 |
| S3 | aspheric | 4.6120 | 0.2400 | 1.67 | 20.4 | 15.8690 |
| S4 | aspheric | 1.5623 | 0.2516 | | | 0.4882 |
| STO | spherical | infinite | 0.0580 | | | 0.0000 |
| S5 | aspheric | −18.3231 | 0.2400 | 1.55 | 56.1 | −6.0622 |
| S6 | aspheric | 5.1820 | 1.2853 | | | −4.3330 |
| S7 | aspheric | −6.4826 | 0.5680 | 1.65 | 23.5 | 13.9308 |
| S8 | aspheric | −4.5554 | 0.1241 | | | −14.6331 |
| S9 | aspheric | −3.8718 | 0.3300 | 1.54 | 55.8 | −7.8551 |
| S10 | aspheric | −27.6606 | 0.2771 | | | −99.0000 |
| S11 | spherical | infinite | 0.2100 | 1.52 | 64.2 | |
| S12 | spherical | infinite | 0.3929 | | | |
| S13 | spherical | infinite | | | | |

TABLE 11

| Surface number | A4 | A6 | A8 | A10 | A12 |
|---|---|---|---|---|---|
| S1 | −4.6199E−03 | −5.3784E−02 | 1.7510E−01 | −3.7891E−01 | 4.2891E−01 |
| S2 | −1.8771E−02 | 4.4585E−01 | −1.3816E+00 | 2.1547E+00 | −1.3159E+00 |
| S3 | −1.6372E−01 | 5.9507E−01 | −3.4900E−01 | −5.0936E+00 | 2.1997E+01 |
| S4 | −1.3278E−01 | 1.0201E+00 | −6.0882E+00 | 4.2665E+01 | −2.0040E+02 |
| S5 | 2.8628E−01 | −9.2109E−01 | 1.0812E+01 | −7.4428E+01 | 3.1725E+02 |
| S6 | 2.7840E−01 | 7.0752E−01 | −8.6897E+00 | 5.9441E+01 | −2.5313E+02 |
| S7 | −5.2166E−02 | 3.1512E−01 | −8.3171E−01 | 1.1516E+00 | −9.4364E−01 |
| S8 | −1.8311E−01 | 2.8139E−01 | −2.8474E−01 | 1.5601E−01 | −4.9529E−02 |
| S9 | −1.8365E−01 | −5.3032E−01 | 1.7227E+00 | −2.1208E+00 | 1.4329E+00 |
| S10 | −6.5143E−02 | −4.0786E−01 | 8.3379E−01 | −7.6952E−01 | 4.1449E−01 |

| Surface number | A14 | A16 | A18 | A20 |
|---|---|---|---|---|
| S1 | −2.1863E−01 | −3.1405E−02 | 8.1724E−02 | −2.6020E−02 |
| S2 | −1.1037E+00 | 2.5603E+00 | −1.7385E+00 | 4.2669E−01 |
| S3 | −4.4976E+01 | 5.1576E+01 | −3.1801E+01 | 8.2202E+00 |
| S4 | 5.9134E+02 | −1.0475E+03 | 1.0197E+03 | −4.1730E+02 |
| S5 | −8.5284E+02 | 1.4064E+03 | −1.2981E+03 | 5.1371E+02 |
| S6 | 6.6952E+02 | −1.0707E+03 | 9.4707E+02 | −3.5537E+02 |
| S7 | 4.6968E−01 | −1.3795E−01 | 2.1839E−02 | −1.4283E−03 |
| S8 | 6.9734E−03 | 1.7513E−03 | −9.2148E−04 | 1.0855E−04 |
| S9 | −5.7531E−01 | 1.3737E−01 | −1.8088E−02 | 1.0142E−03 |
| S10 | −1.3847E−01 | 2.8328E−02 | −3.2561E−03 | 1.6120E−04 |

TABLE 12

| | parameter | | | | | | | |
|---|---|---|---|---|---|---|---|---|
| | f1 (mm) | f2 (mm) | f3 (mm) | f4 (mm) | f5 (mm) | f (mm) | TTL (mm) | ImgH (mm) |
| numerical value | 2.24 | −3.66 | −7.37 | 21.35 | −8.43 | 5.56 | 4.95 | 2.45 |

Figure 8A:
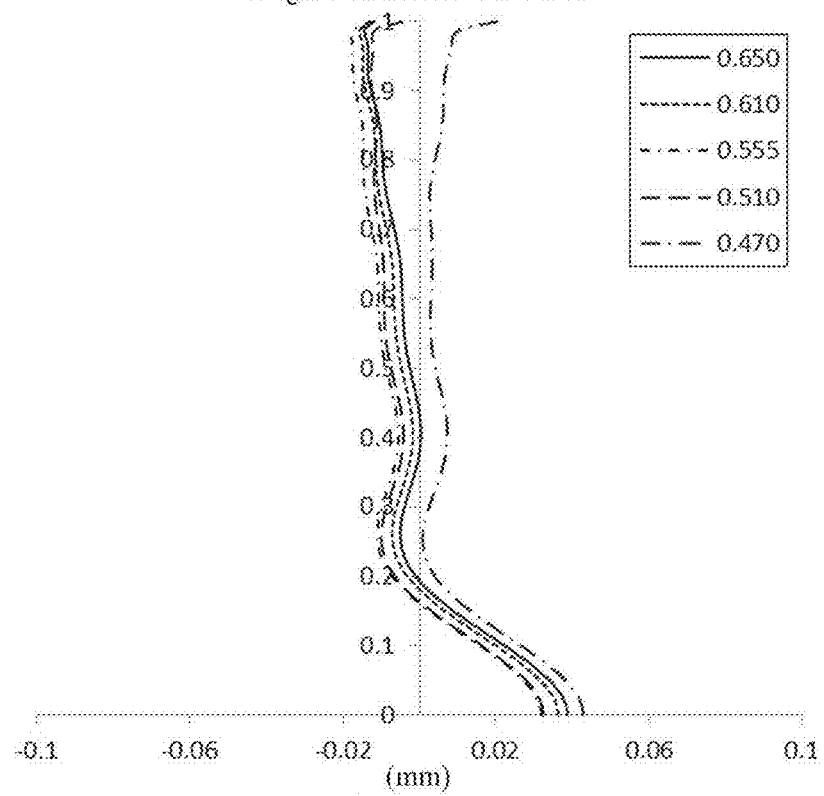
FIGS. 8A-8D respectively illustrate a longitudinal aberration curve, an astigmatic curve, a distortion curve, and a lateral color curve of the optical imaging lens assembly according to Embodiment 4.
Figure 8B:
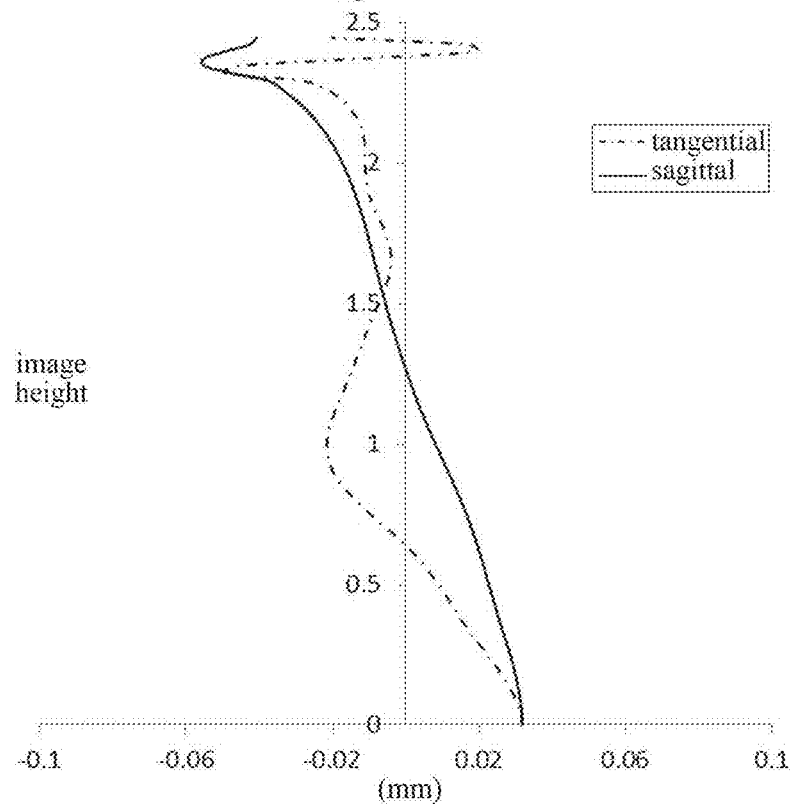
Figure 8C:
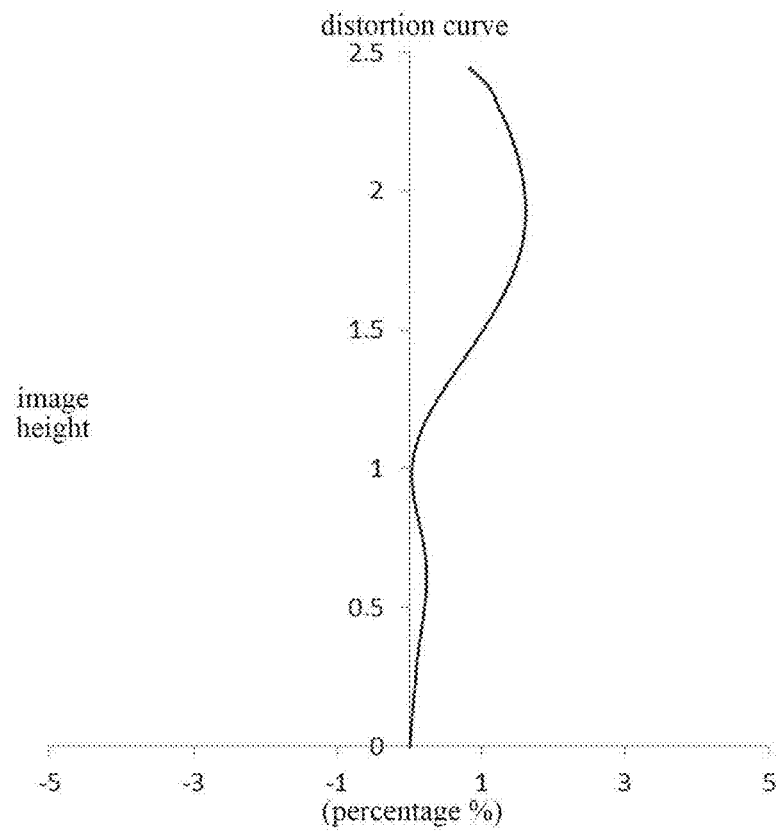
Figure 8D:
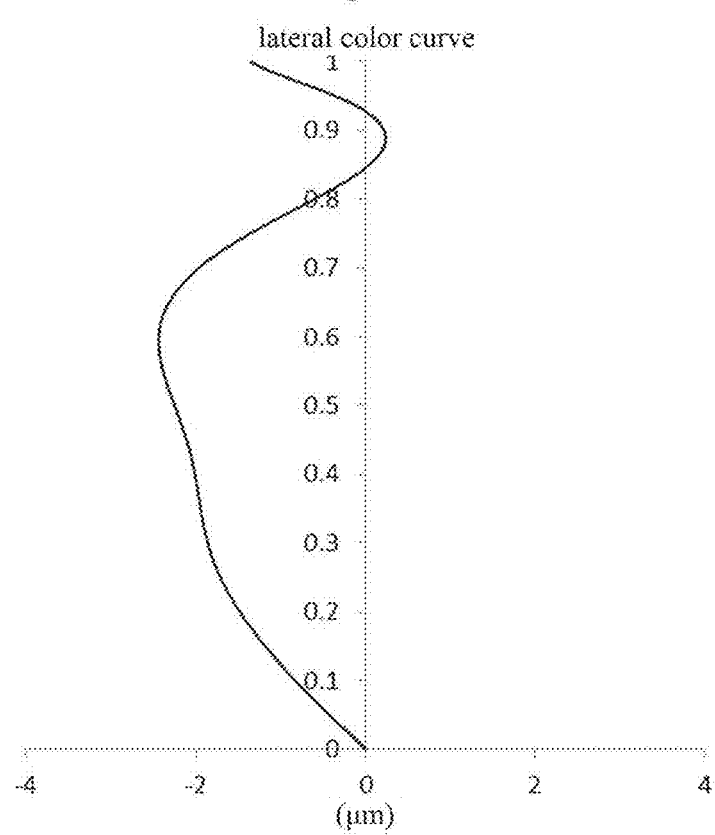

FIG. 8A illustrates the longitudinal aberration curve of the optical imaging lens assembly according to Embodiment 4, representing deviations of focal points of light of different wavelengths converged after passing through the lens assembly. FIG. 8B illustrates the astigmatic curve of the lens assembly according to Embodiment 4, representing a curvature of the tangential image plane and a curvature of the sagittal image plane. FIG. 8C illustrates the distortion curve of the optical imaging lens assembly according to Embodiment 4, representing amounts of distortion at different viewing angles. FIG. 8D illustrates the lateral color curve of the lens assembly according to Embodiment 4, representing deviations of different image heights on the image plane after light passes through the lens assembly. It can be seen from FIGS. 8A-8D that the optical imaging lens assembly according to Embodiment 4 can achieve a good imaging quality.

Embodiment 5

Figure 9:
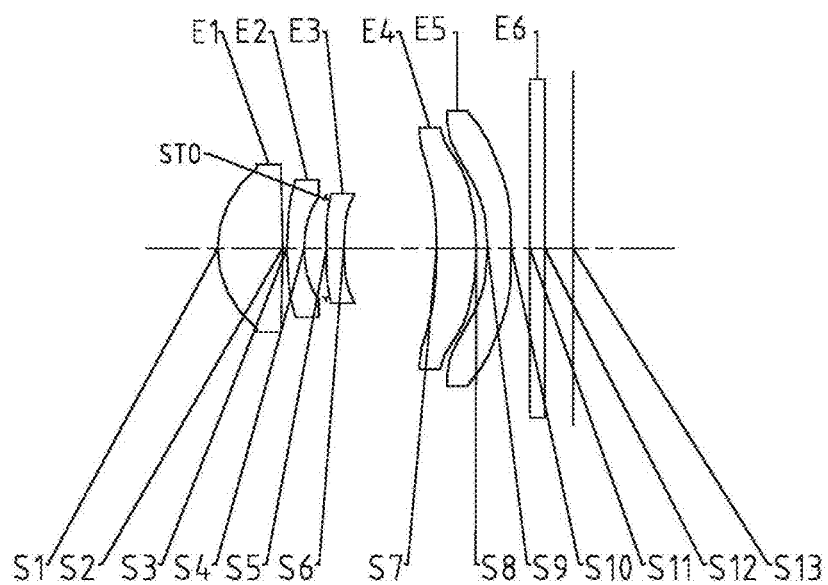
FIG. 9 is a schematic structural diagram illustrating an optical imaging lens assembly according to Embodiment 5 of the present disclosure.

An optical imaging lens assembly according to Embodiment 5 of the present disclosure is described below with reference to FIGS. 9-10D. FIG. 9 is a schematic structural diagram illustrating the optical imaging lens assembly according to Embodiment 5 of the present disclosure.

As shown in FIG. 9, the optical imaging lens assembly includes, sequentially along an optical axis from an object side to an image side:

A first lens E1 having a positive refractive power, an object-side surface S1 of the first lens E1 is a convex surface, and an image-side surface S2 of the first lens E1 is a convex surface. The object-side surface S1 and the image-side surface S2 of the first lens E1 are both aspheric surfaces.

A second lens E2 having a negative refractive power, an object-side surface S3 of the second lens E2 is a convex surface, and an image-side surface S4 of the second lens E2 is a concave surface. The object-side surface S3 and the image-side surface S4 of the second lens E2 are both aspheric surfaces.

A third lens E3 having a negative refractive power, an object-side surface S5 of the third lens E3 is a concave surface, and an image-side surface S6 of the third lens E3 is a concave surface. The object-side surface S5 and the image-side surface S6 of the third lens E3 are both aspheric surfaces.

A fourth lens E4 having a positive refractive power, an object-side surface S7 of the fourth lens E4 is a concave surface, and an image-side surface S8 of the fourth lens E4 is a convex surface. The object-side surface S7 and the image-side surface S8 of the fourth lens E4 are both aspheric surfaces.

A fifth lens E5 having a negative refractive power, an object-side surface S9 of the fifth lens E5 is a concave surface, and an image-side surface S10 of the fifth lens E5 is a convex surface. The object-side surface S9 and the image-side surface S10 of the fifth lens E5 are both aspheric surfaces.

The optical imaging lens assembly may further include a photosensitive element disposed on an image plane S13. Alternatively, an optical filter E6 having an object-side surface S11 and an image-side surface S12 may be disposed between the fifth lens E5 and the image plane S13. Light from an object sequentially passes through the surfaces S1-S12 and finally forms an image on the image plane S13.

Alternatively, a diaphragm STO for limiting light beams may be disposed between the second lens E2 and the third lens E3, to further improve the imaging quality of the lens assembly.

Table 13 shows the surface type, the radius of curvature, the thickness, the material and the conic coefficient of each lens of the optical imaging lens assembly in Embodiment 5. The units of the radius of curvature and the thickness are both millimeters (mm). Table 14 shows the high-order coefficients applicable to each aspheric surface in Embodiment 5. The surface type of each aspheric surface may be defined by the formula (1) given in Embodiment 1. Table 15 shows the effective focal lengths f1-f5 of the lenses in Embodiment 5, the total effective focal length f of the optical imaging lens assembly, the total track length TTL of the optical imaging lens assembly, and the half of the diagonal length ImgH of the effective pixel area on the image plane S13 of the optical imaging lens assembly.

TABLE 13

| surface number | surface type | radius of curvature | thickness | material refractive index | abbe number | conic coefficient |
|---|---|---|---|---|---|---|
| OBJ | spherical | infinite | infinite | | | |
| S1 | aspheric | 1.3694 | 0.9050 | 1.55 | 56.1 | 0.1490 |
| S2 | aspheric | −9.5153 | 0.0600 | | | −40.8121 |
| S3 | aspheric | 4.5123 | 0.2400 | 1.67 | 20.4 | 14.4410 |
| S4 | aspheric | 1.5656 | 0.3066 | | | 0.5159 |
| STO | spherical | infinite | 0.0050 | | | 0.0000 |
| S5 | aspheric | −79.7971 | 0.2400 | 1.55 | 56.1 | 99.0000 |
| S6 | aspheric | 4.3318 | 1.2927 | | | −7.4316 |
| S7 | aspheric | −6.9617 | 0.5528 | 1.65 | 23.5 | 13.8082 |
| S8 | aspheric | −4.4877 | 0.1559 | | | −18.7382 |
| S9 | aspheric | −3.5652 | 0.3300 | 1.54 | 55.8 | −16.4289 |
| S10 | aspheric | −29.4483 | 0.2588 | | | −99.0000 |
| S11 | spherical | infinite | 0.2100 | 1.52 | 64.2 | |
| S12 | spherical | infinite | 0.3931 | | | |
| S13 | spherical | infinite | | | | |

TABLE 14

| Surface number | A4 | A6 | A8 | A10 | A12 |
|---|---|---|---|---|---|
| S1 | −5.4172E−03 | −4.6539E−02 | 1.3606E−01 | −2.6658E−01 | 2.4373E−01 |
| S2 | −1.7750E−02 | 3.8349E−01 | −1.0983E+00 | 1.6322E+00 | −1.1175E+00 |
| S3 | −1.5160E−01 | 5.0575E−01 | −8.7047E−02 | −4.7523E+00 | 1.7942E+01 |
| S4 | −1.2117E−01 | 9.7992E−01 | −6.4120E+00 | 4.6801E+01 | −2.2186E+02 |
| S5 | 2.8488E−01 | −8.5009E−01 | 9.5713E+00 | −6.5705E+01 | 2.8217E+02 |
| S6 | 2.7818E−01 | 7.5363E−01 | −9.5185E+00 | 6.4996E+01 | −2.7412E+02 |
| S7 | −4.1363E−02 | 2.4689E−01 | −6.9923E−01 | 1.0112E+00 | −8.6168E−01 |
| S8 | −1.1163E−01 | 7.3789E−02 | 8.6553E−03 | −1.0938E−01 | 1.1947E−01 |
| S9 | −9.3521E−02 | −8.1453E−01 | 2.1171E+00 | −2.4469E+00 | 1.6082E+00 |
| S10 | −4.1453E−02 | −4.6732E−01 | 9.0508E−01 | −8.1452E−01 | 4.2803E−01 |

| Surface number | A14 | A16 | A18 | A20 |
|---|---|---|---|---|
| S1 | −3.7179E−02 | −1.3302E−01 | 1.1069E−01 | −2.8823E−02 |
| S2 | −2.7514E−01 | 1.0907E+00 | −7.4545E−01 | 1.7606E−01 |
| S3 | −3.3972E+01 | 3.6779E+01 | −2.1643E+01 | 5.3753E+00 |
| S4 | 6.5254E+02 | −1.1497E+03 | 1.1140E+03 | −4.5544E+02 |
| S5 | −7.6734E+02 | 1.2816E+03 | −1.1986E+03 | 4.8045E+02 |
| S6 | 7.1846E+02 | −1.1408E+03 | 1.0039E+03 | −3.7544E+02 |
| S7 | 4.4494E−01 | −1.3550E−01 | 2.2351E−02 | −1.5447E−03 |
| S8 | −6.9113E−02 | 2.4243E−02 | −4.7224E−03 | 3.8182E−04 |
| S9 | −6.3783E−01 | 1.5169E−01 | −1.9987E−02 | 1.1243E−03 |
| S10 | −1.3894E−01 | 2.7489E−02 | −3.0409E−03 | 1.4406E−04 |

TABLE 15

| | f1 (mm) | f2 (mm) | f3 (mm) | f4 (mm) | f5 (mm) | f (mm) | TTL (mm) | ImgH (mm) |
|---|---|---|---|---|---|---|---|---|
| parameter | | | | | | | | |
| Numerical value | 2.26 | −3.72 | −7.52 | 18.05 | −7.59 | 5.56 | 4.35 | 2.16 |

Figure 10A:
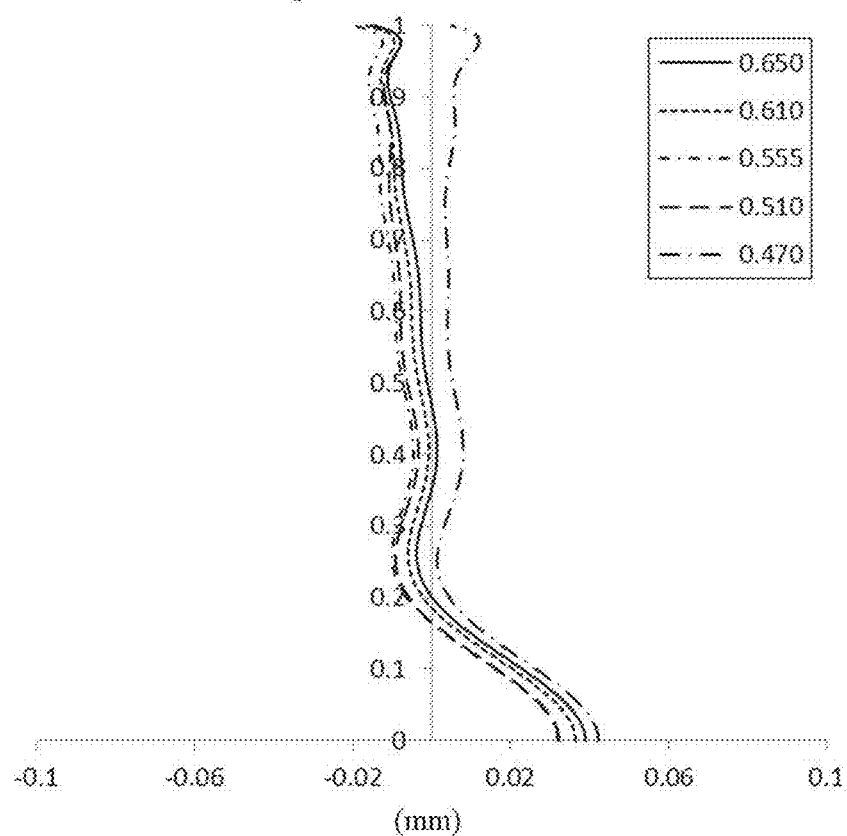
FIGS. 10A-10D respectively illustrate a longitudinal aberration curve, an astigmatic curve, a distortion curve, and a lateral color curve of the optical imaging lens assembly according to Embodiment 5.
Figure 10B:
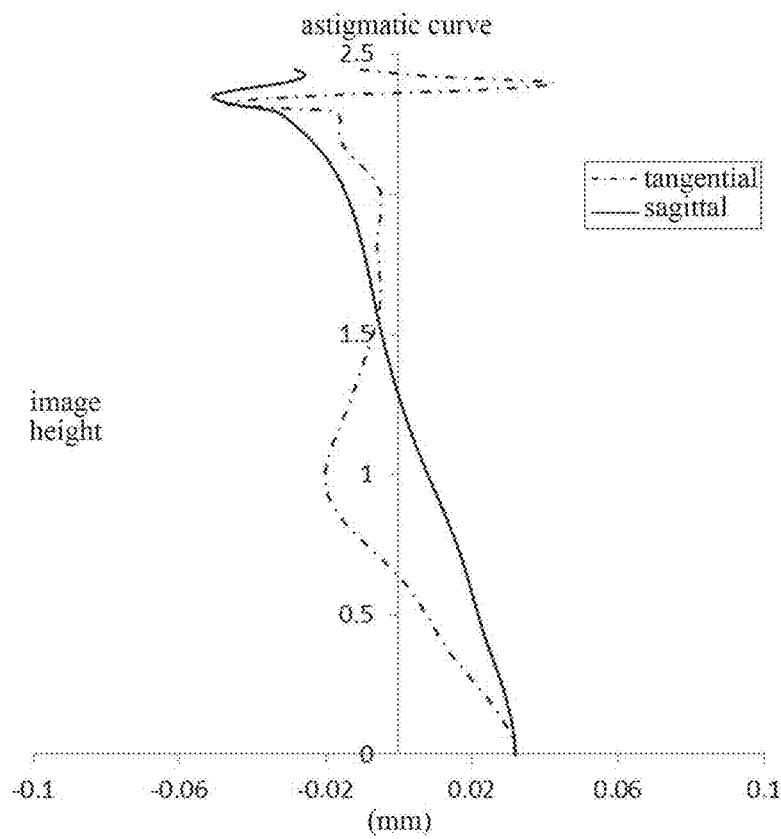
Figure 10C:
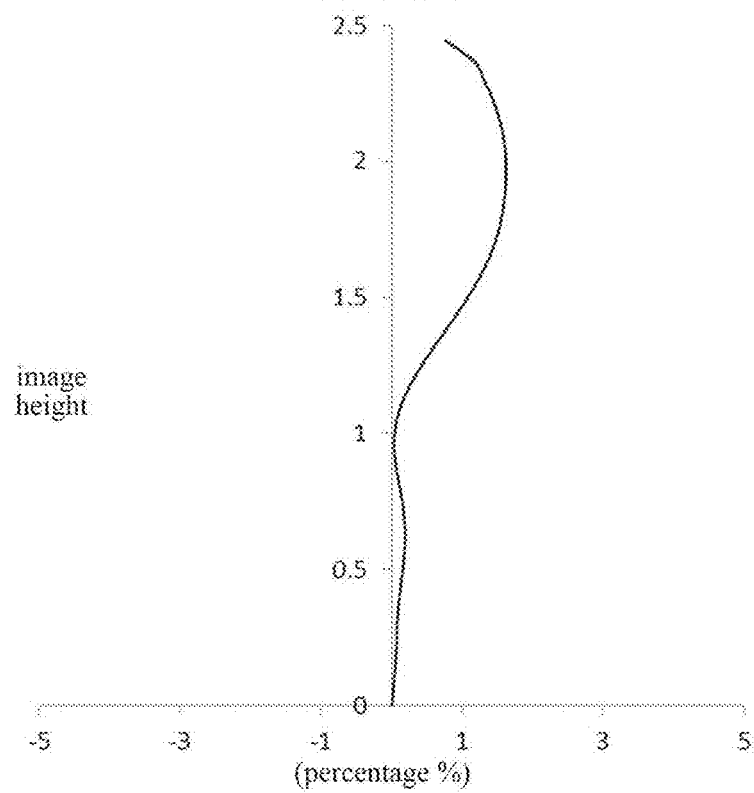
Figure 10D:
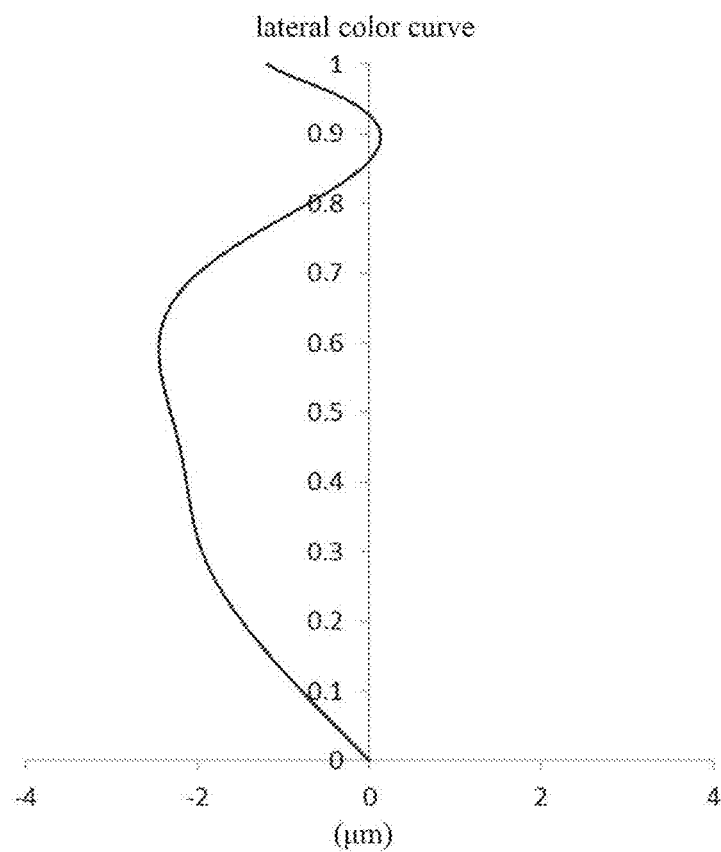

FIG. 10A illustrates the longitudinal aberration curve of the optical imaging lens assembly according to Embodiment 5, representing deviations of focal points of light of different wavelengths converged after passing through the lens assembly. FIG. 10B illustrates the astigmatic curve of the optical imaging lens assembly according to Embodiment 5, representing a curvature of the tangential image plane and a curvature of the sagittal image plane. FIG. 10C illustrates the distortion curve of the optical imaging lens assembly according to Embodiment 5, representing amounts of distortion at different viewing angles. FIG. 10D illustrates the lateral color curve of the optical imaging lens assembly according to Embodiment 5, representing deviations of different image heights on the image plane after light passes through the lens assembly. It can be seen from FIGS. 10A-10D that the optical imaging lens assembly according to Embodiment 5 can achieve a good imaging quality.

Embodiment 6

Figure 11:
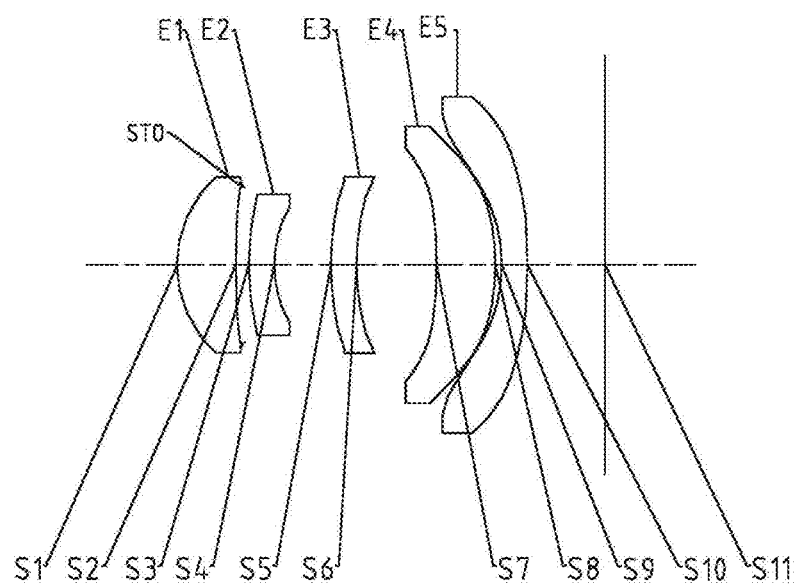
FIG. 11 is a schematic structural diagram illustrating an optical imaging lens assembly according to Embodiment 6 of the present disclosure.

An optical imaging lens assembly according to Embodiment 6 of the present disclosure is described below with reference to FIGS. 11-12D. FIG. 11 is a schematic structural diagram illustrating the optical imaging lens assembly according to Embodiment 6 of the present disclosure.

As shown in FIG. 11, the optical imaging lens assembly includes, sequentially along an optical axis from an object side to an image side:

A first lens E1 having a positive refractive power, an object-side surface S1 of the first lens E1 is a convex surface, and an image-side surface S2 of the first lens E1 is a concave surface. The object-side surface S1 and the image-side surface S2 of the first lens E1 are both aspheric surfaces.

A second lens E2 having a negative refractive power, an object-side surface S3 of the second lens E2 is a convex surface, and an image-side surface S4 of the second lens E2 is a concave surface. The object-side surface S3 and the image-side surface S4 of the second lens E2 are both aspheric surfaces.

A third lens E3 having a negative refractive power, an object-side surface S5 of the third lens E3 is a convex surface, and an image-side surface S6 of the third lens E3 is a concave surface. The object-side surface S5 and the image-side surface S6 of the third lens E3 are both aspheric surfaces.

A fourth lens E4 having a positive refractive power, an object-side surface S7 of the fourth lens E4 is a concave surface, and an image-side surface S8 of the fourth lens E4 is a convex surface. The object-side surface S7 and the image-side surface S8 of the fourth lens E4 are both aspheric surfaces.

A fifth lens E5 having a negative refractive power, an object-side surface S9 of the fifth lens E5 is a concave surface, and an image-side surface S10 of the fifth lens E5 is a convex surface. The object-side surface S9 and the image-side surface S10 of the fifth lens E5 are both aspheric surfaces.

The optical imaging lens assembly may further include a photosensitive element disposed on an image plane S11. Light from an object sequentially passes through the surfaces S1-S10 and finally forms an image on the image plane S11.

Alternatively, a diaphragm STO for limiting light beams may be disposed between the first lens E1 and the second lens E2, to further improve the imaging quality of the lens assembly.

Table 16 shows the surface type, the radius of curvature, the thickness, the material and the conic coefficient of each lens of the optical imaging lens assembly in Embodiment 6. The units of the radius of curvature and the thickness are both millimeters (mm). Table 17 shows the high-order coefficients applicable to each aspheric surface in Embodiment 6. The surface type of each aspheric surface may be defined by the formula (1) given in Embodiment 1. Table 18 shows the effective focal lengths f1-f5 of the lenses in Embodiment 6, the total effective focal length f of the optical imaging lens assembly, the total track length TTL of the optical imaging lens assembly, and the half of the diagonal length ImgH of the effective pixel area on the image plane S11 of the optical imaging lens assembly.

TABLE 16

| surface number | surface type | radius of curvature | thickness | refractive index | abbe number | conic coefficient |
|---|---|---|---|---|---|---|
| OBJ | spherical | infinite | infinite | | | |
| S1 | aspheric | 1.8307 | 0.9215 | 1.55 | 56.1 | 0.0033 |
| S2 | aspheric | 12.4942 | 0.1000 | | | −99.0000 |
| STO | spherical | infinite | 0.1000 | | | 0.0000 |
| S3 | aspheric | 3.9660 | 0.4000 | 1.67 | 20.4 | 9.7933 |
| S4 | aspheric | 1.8515 | 0.8823 | | | −0.1005 |
| S5 | aspheric | 4.0124 | 0.4000 | 1.55 | 56.1 | −11.0460 |
| S6 | aspheric | 3.8144 | 1.2490 | | | −0.0711 |
| S7 | aspheric | −8.5387 | 0.9167 | 1.65 | 23.5 | 17.6315 |
| S8 | aspheric | −3.1850 | 0.1000 | | | −0.0504 |
| S9 | aspheric | −2.5899 | 0.4000 | 1.54 | 55.8 | −0.1735 |
| S10 | aspheric | −173.6083 | 1.2126 | | | 99.0000 |
| S11 | spherical | infinite | | | | |

TABLE 17

| surface number | A4 | A6 | A8 | A10 | A12 |
|---|---|---|---|---|---|
| S1 | 4.3842E−03 | −3.5289E−02 | 1.1149E−01 | −2.0532E−01 | 2.3440E−01 |
| S2 | −3.2127E−02 | 9.4000E−02 | −1.9129E−01 | 3.6893E−01 | −5.0379E−01 |
| S3 | −9.9563E−02 | 7.2506E−02 | 9.2447E−02 | −4.3885E−01 | 7.8989E−01 |
| S4 | −7.4918E−02 | 3.6579E−01 | −1.8733E+00 | 7.6322E+00 | −1.9517E+01 |
| S5 | −1.3755E−02 | −2.7306E−02 | 1.4305E−01 | −2.4936E−01 | 2.7886E−01 |
| S6 | −3.1280E−02 | 3.1504E−02 | −4.3938E−02 | 1.0172E−01 | −1.3053E−01 |
| S7 | 2.0641E−02 | −1.1447E−01 | 1.7935E−01 | −1.7915E−01 | 1.1335E−01 |
| S8 | 1.2976E−01 | −2.8338E−01 | 2.6887E−01 | −1.4967E−01 | 5.2802E−02 |
| S9 | 4.0400E−02 | −1.7252E−01 | 1.8520E−01 | −9.3089E−02 | 2.4879E−02 |

TABLE 17-continued

| S10 | −1.3621E−01 | 1.2363E−01 | −7.6024E−02 | 3.2906E−02 | −9.8271E−03 |

| surface number | A14 | A16 | A18 | A20 |
|---|---|---|---|---|
| S1 | −1.6701E−01 | 7.2376E−02 | −1.7420E−02 | 1.7848E−03 |
| S2 | 4.4824E−01 | −2.4683E−01 | 7.6258E−02 | −1.0110E−02 |
| S3 | −8.5206E−01 | 5.4601E−01 | −1.8978E−01 | 2.6388E−02 |
| S4 | 3.1167E+01 | −3.0215E+01 | 1.6266E+01 | −3.7300E+00 |
| S5 | −2.0358E−01 | 9.3199E−02 | −2.4234E−02 | 2.7189E−03 |
| S6 | 9.9166E−02 | −4.5283E−02 | 1.1525E−02 | −1.2636E−03 |
| S7 | −4.5372E−02 | 1.1232E−02 | −1.5758E−03 | 9.5894E−05 |
| S8 | −1.2322E−02 | 1.9068E−03 | −1.8026E−04 | 7.8363E−06 |
| S9 | −3.3788E−03 | 1.5180E−04 | 1.1713E−05 | −1.1203E−06 |
| S10 | 1.9449E−03 | −2.4229E−04 | 1.7175E−05 | −5.2753E−07 |

TABLE 18

| | parameter | | | | | | | |
|---|---|---|---|---|---|---|---|---|
| | f1 (mm) | f2 (mm) | f3 (mm) | f4 (mm) | f5 (mm) | f (mm) | TTL (mm) | ImgH (mm) |
| numerical value | 3.81 | −5.64 | −494.39 | 7.40 | −4.90 | 7.48 | 6.68 | 3.25 |

Figure 12A:
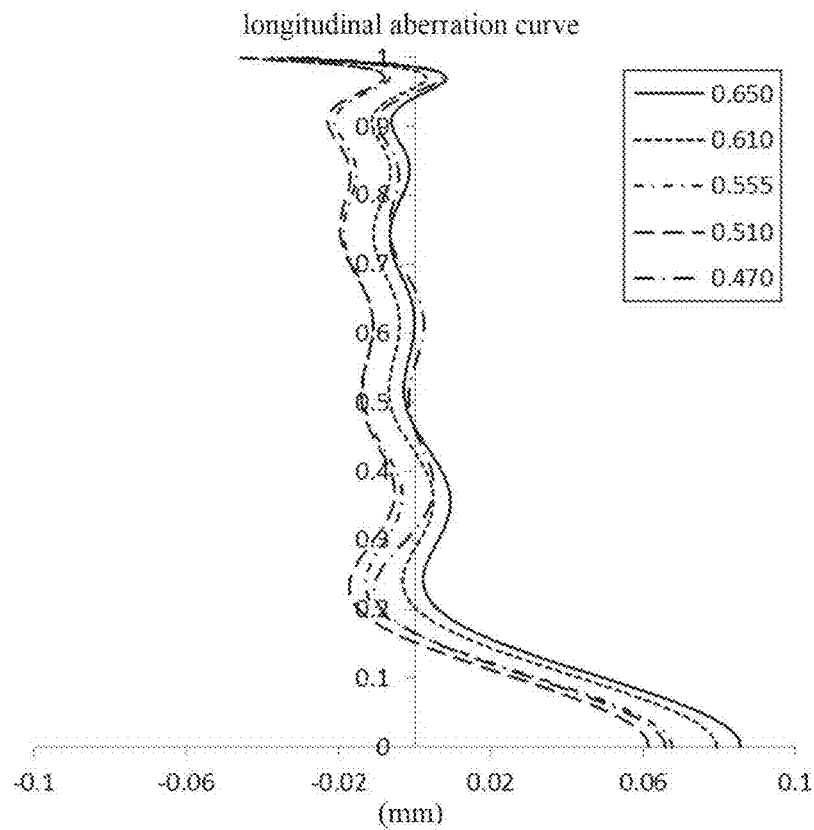
FIGS. 12A-12D respectively illustrate a longitudinal aberration curve, an astigmatic curve, a distortion curve, and a lateral color curve of the optical imaging lens assembly according to Embodiment 6.
Figure 12B:
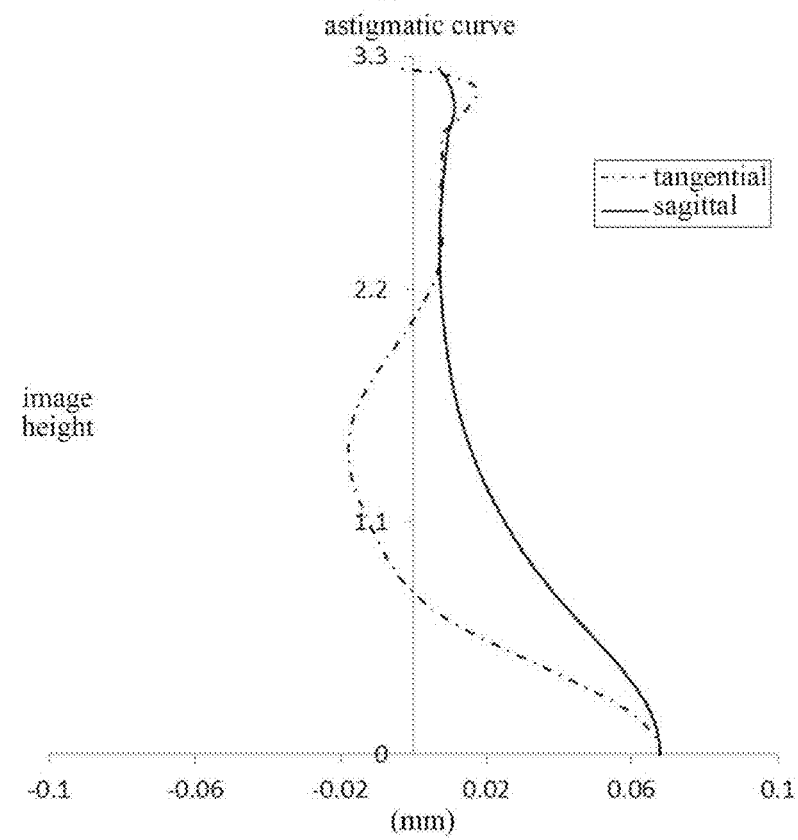
Figure 12C:
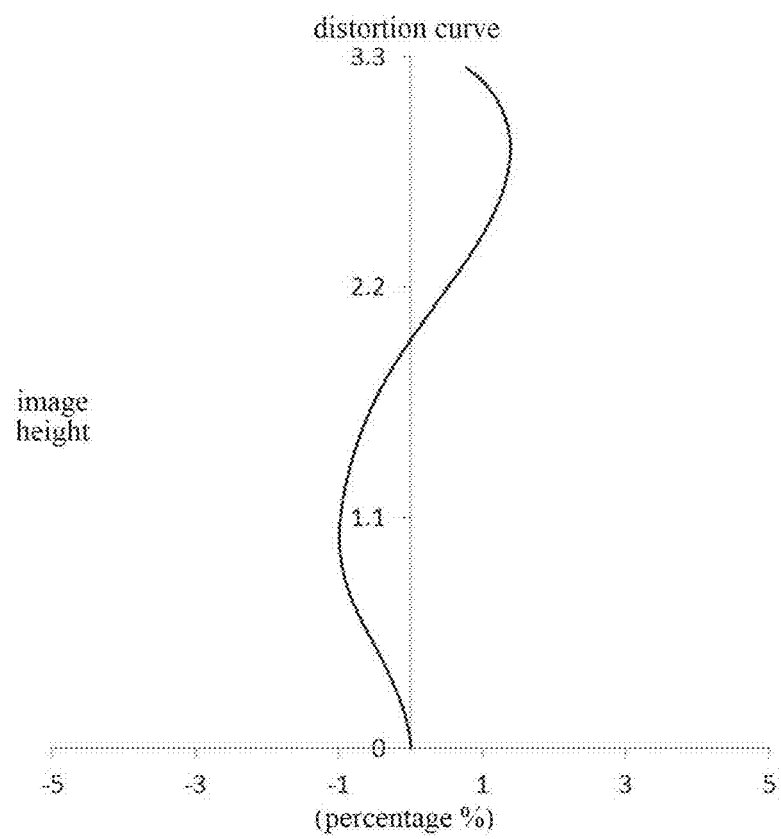
Figure 12D:
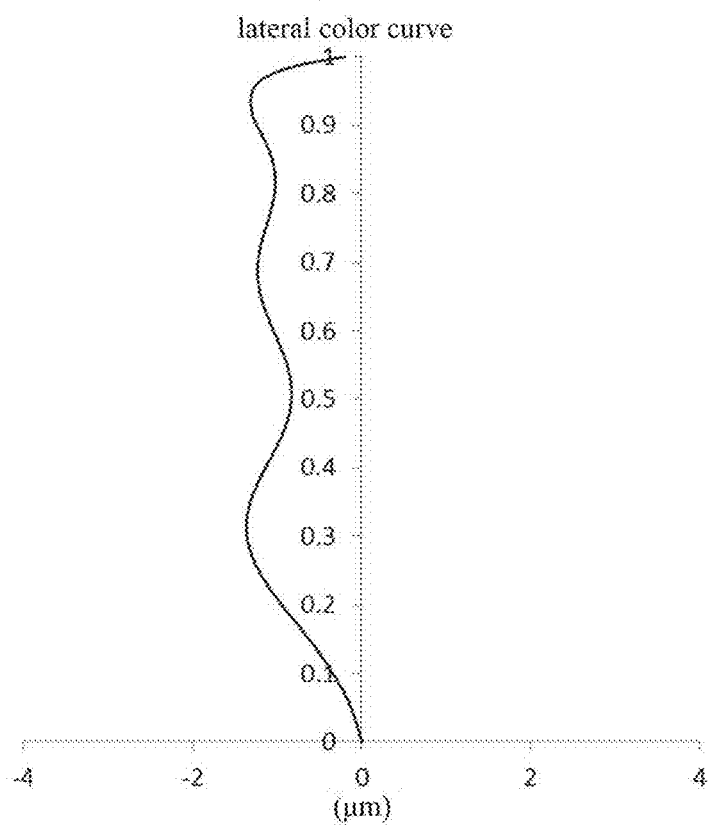

FIG. 12A illustrates the longitudinal aberration curve of the optical imaging lens assembly according to Embodiment 6, representing deviations of focal points of light of different wavelengths converged after passing through the lens assembly. FIG. 12B illustrates the astigmatic curve of the optical imaging lens assembly according to Embodiment 6, representing a curvature of the tangential image plane and a curvature of the sagittal image plane. FIG. 12C illustrates the distortion curve of the optical imaging lens assembly according to Embodiment 6, representing amounts of distortion at different viewing angles. FIG. 12D illustrates the lateral color curve of the optical imaging lens assembly according to Embodiment 6, representing deviations of different image heights on the image plane after light passes through the lens assembly. It can be seen from FIGS. 12A-12D that the optical imaging lens assembly according to Embodiment 6 can achieve a good imaging quality.

Embodiment 7

Figure 13:
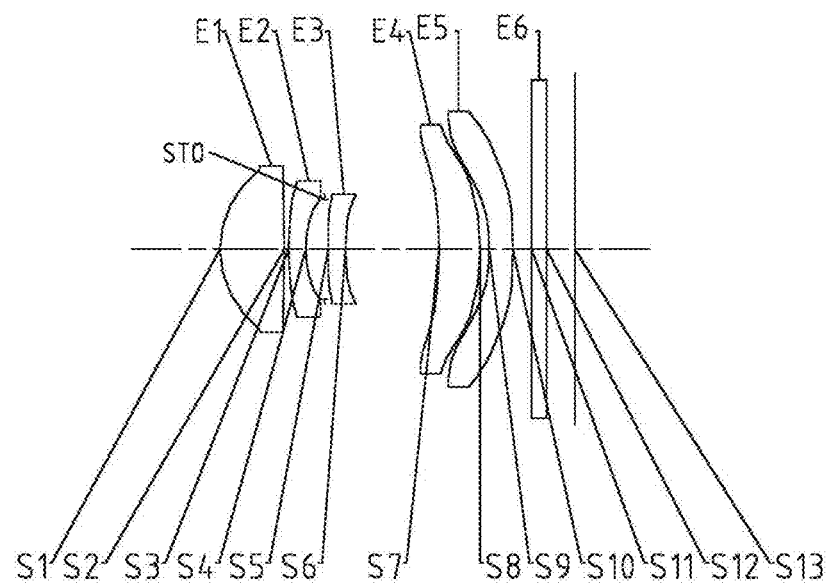
FIG. 13 is a schematic structural diagram illustrating an optical imaging lens assembly according to Embodiment 7 of the present disclosure.

An optical imaging lens assembly according to Embodiment 7 of the present disclosure is described below with reference to FIGS. 13-14D. FIG. 13 is a schematic structural diagram illustrating the optical imaging lens assembly according to Embodiment 7 of the present disclosure.

As shown in FIG. 13, the optical imaging lens assembly includes, sequentially along an optical axis from an object side to an image side:

A first lens E1 having a positive refractive power, an object-side surface S1 of the first lens E1 is a convex surface, and an image-side surface S2 of the first lens E1 is a convex surface. The object-side surface S1 and the image-side surface S2 of the first lens E1 are both aspheric surfaces.

A second lens E2 having a negative refractive power, an object-side surface S3 of the second lens E2 is a convex surface, and an image-side surface S4 of the second lens E2 is a concave surface. The object-side surface S3 and the image-side surface S4 of the second lens E2 are both aspheric surfaces.

A third lens E3 having a negative refractive power, an object-side surface S5 of the third lens E3 is a concave surface, and an image-side surface S6 of the third lens E3 is a concave surface. The object-side surface S5 and the image-side surface S6 of the third lens E3 are both aspheric surfaces.

A fourth lens E4 having a positive refractive power, an object-side surface S7 of the fourth lens E4 is a concave surface, and an image-side surface S8 of the fourth lens E4 is a convex surface. The object-side surface S7 and the image-side surface S8 of the fourth lens E4 are both aspheric surfaces.

A fifth lens E5 having a negative refractive power, an object-side surface S9 of the fifth lens E5 is a concave surface, and an image-side surface S10 of the fifth lens E5 is a convex surface. The object-side surface S9 and the image-side surface S10 of the fifth lens E5 are both aspheric surfaces.

The optical imaging lens assembly may further include a photosensitive element disposed on an image plane S13. Alternatively, an optical filter E6 having an object-side surface S11 and an image-side surface S12 may be disposed between the fifth lens E5 and the image plane S13. Light from an object sequentially passes through the surfaces S1-S12 and finally forms an image on the image plane S13.

Alternatively, a diaphragm STO for limiting light beams may be disposed between the second lens E2 and the third lens E3, to further improve the imaging quality of the lens assembly.

Table 19 shows the surface type, the radius of curvature, the thickness, the material and the conic coefficient of each lens of the optical imaging lens assembly in Embodiment 7. The radius of curvature and the thickness are shown in millimeters (mm). Table 20 shows the high-order coefficients applicable to each aspheric surface in Embodiment 7. The surface type of each aspheric surface may be defined by the formula (1) given in Embodiment 1. Table 21 shows the effective focal lengths f1-f5 of the lenses in Embodiment 7, the total effective focal length f of the optical imaging lens assembly, the total track length TTL of the optical imaging lens assembly, and the half of the diagonal length ImgH of the effective pixel area on the image plane S13 of the optical imaging lens assembly.

TABLE 19

| | | | | material | | |
|---|---|---|---|---|---|---|
| surface number | surface type | radius of curvature | thickness | refractive index | abbe number | conic coefficient |
| OBJ | spherical | infinite | infinite | | | |
| S1 | aspheric | 1.3572 | 0.8972 | 1.55 | 56.1 | 0.1446 |
| S2 | aspheric | −9.5086 | 0.0600 | | | −17.4473 |

TABLE 19-continued

| surface number | surface type | radius of curvature | thickness | material refractive index | abbe number | conic coefficient |
|---|---|---|---|---|---|---|
| S3 | aspheric | 4.6002 | 0.2400 | 1.67 | 20.4 | 16.0155 |
| S4 | aspheric | 1.5716 | 0.2658 | | | 0.4795 |
| STO | spherical | infinite | 0.0480 | | | 0.0000 |
| S5 | aspheric | −18.5678 | 0.2400 | 1.55 | 56.1 | −79.2621 |
| S6 | aspheric | 5.1680 | 1.3046 | | | −3.1779 |
| S7 | aspheric | −6.5840 | 0.5730 | 1.65 | 23.5 | 13.9771 |
| S8 | aspheric | −4.6292 | 0.1264 | | | −13.7149 |
| S9 | aspheric | −3.7707 | 0.3300 | 1.54 | 55.8 | −8.3325 |
| S10 | aspheric | −24.3125 | 0.2619 | | | −27.0008 |
| S11 | spherical | infinite | 0.2100 | 1.52 | 64.2 | |
| S12 | spherical | infinite | 0.3931 | | | |
| S13 | spherical | infinite | | | | |

TABLE 20

| Surfae numbr | A4 | A6 | A8 | A10 | A12 |
|---|---|---|---|---|---|
| S1 | −4.5938E−03 | −5.3558E−02 | 1.7652E−01 | −3.8810E−01 | 4.5122E−01 |
| S2 | −2.3869E−02 | 4.9728E−01 | −1.7095E+00 | 3.4016E+00 | −4.2077E+00 |
| S3 | −1.6972E−01 | 6.7731E−01 | −1.0039E+00 | −2.0835E+00 | 1.3623E+01 |
| S4 | −1.3305E−01 | 1.0361E+00 | −6.0354E+00 | 4.0277E+01 | −1.8120E+02 |
| S5 | 2.7461E−01 | −5.9291E−01 | 6.2529E+00 | −3.7856E+01 | 1.3886E+02 |
| S6 | 2.7994E−01 | 6.1832E−01 | −7.0310E+00 | 4.4483E+01 | −1.7712E+02 |
| S7 | −5.6180E−02 | 3.3246E−01 | −8.7679E−01 | 1.2183E+00 | −1.0021E+00 |
| S8 | −1.8317E−01 | 2.7156E−01 | −2.6247E−01 | 1.4684E−01 | −6.0258E−02 |
| S9 | −1.4631E−01 | −7.1967E−01 | 2.1191E+00 | −2.5652E+00 | 1.7273E+00 |
| S10 | −3.2130E−02 | −5.1984E−01 | 1.0176E+00 | −9.4278E−01 | 5.1504E−01 |

| Surfae numbr | A14 | A16 | A18 | A20 |
|---|---|---|---|---|
| S1 | −2.4753E−01 | −1.1271E−02 | 7.4881E−02 | −2.5209E−02 |
| S2 | 3.0566E+00 | −1.0615E+00 | 8.2907E−03 | 6.8464E−02 |
| S3 | −3.0477E+01 | 3.6298E+01 | −2.2844E+01 | 5.9801E+00 |
| S4 | 5.1682E+02 | −8.8967E+02 | 8.4444E+02 | −3.3759E+02 |
| S5 | −3.1478E+02 | 4.2892E+02 | −3.1946E+02 | 9.9307E+01 |
| S6 | 4.4200E+02 | −6.7198E+02 | 5.6866E+02 | −2.0515E+02 |
| S7 | 4.9823E−01 | −1.4501E−01 | 2.2493E−02 | −1.4180E−03 |
| S8 | 1.8995E−02 | −3.0299E−03 | −4.8063E−05 | 4.7340E−05 |
| S9 | −6.9412E−01 | 1.6614E−01 | −2.1936E−02 | 1.2333E−03 |
| S10 | −1.7498E−01 | 3.6425E−02 | −4.2599E−03 | 2.1451E−04 |

TABLE 21

| parameter | | | | | | | |
|---|---|---|---|---|---|---|---|
| f1 (mm) | f2 (mm) | f3 (mm) | f4 (mm) | f5 (mm) | f (mm) | TTL (mm) | ImgH (mm) |

| | f1 (mm) | f2 (mm) | f3 (mm) | f4 (mm) | f5 (mm) | f (mm) | TTL (mm) | ImgH (mm) |
|---|---|---|---|---|---|---|---|---|
| numerical value | 2.24 | −3.70 | −7.38 | 21.74 | −8.36 | 5.56 | 4.56 | 2.24 |

Figure 14A:
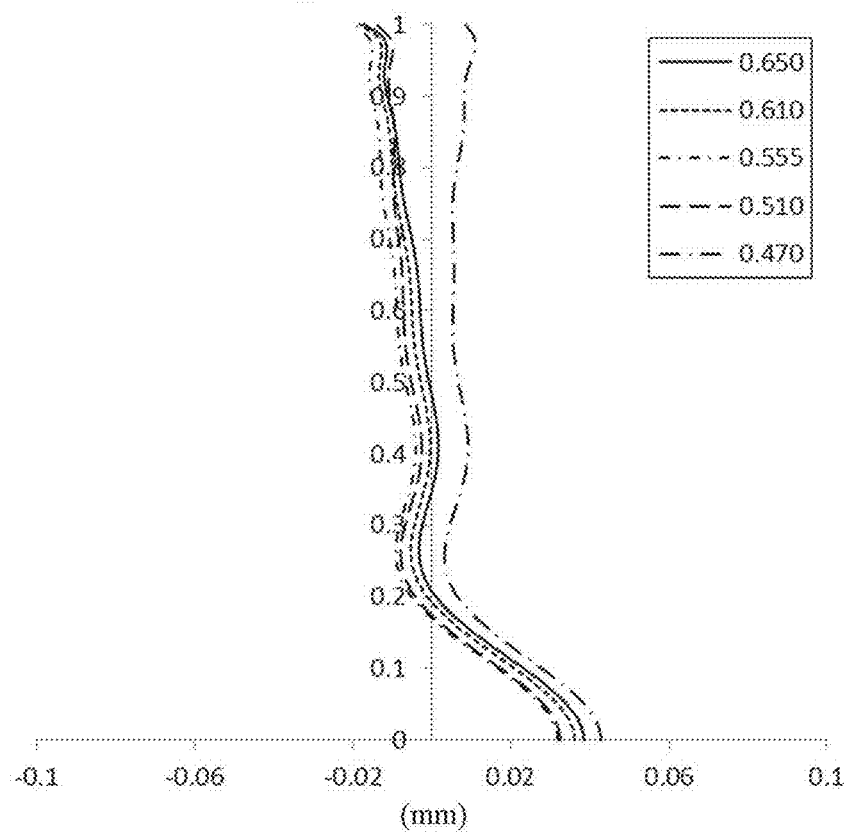
FIGS. 14A-14D respectively illustrate a longitudinal aberration curve, an astigmatic curve, a distortion curve, and a lateral color curve of the optical imaging lens assembly according to Embodiment 7.
Figure 14B:
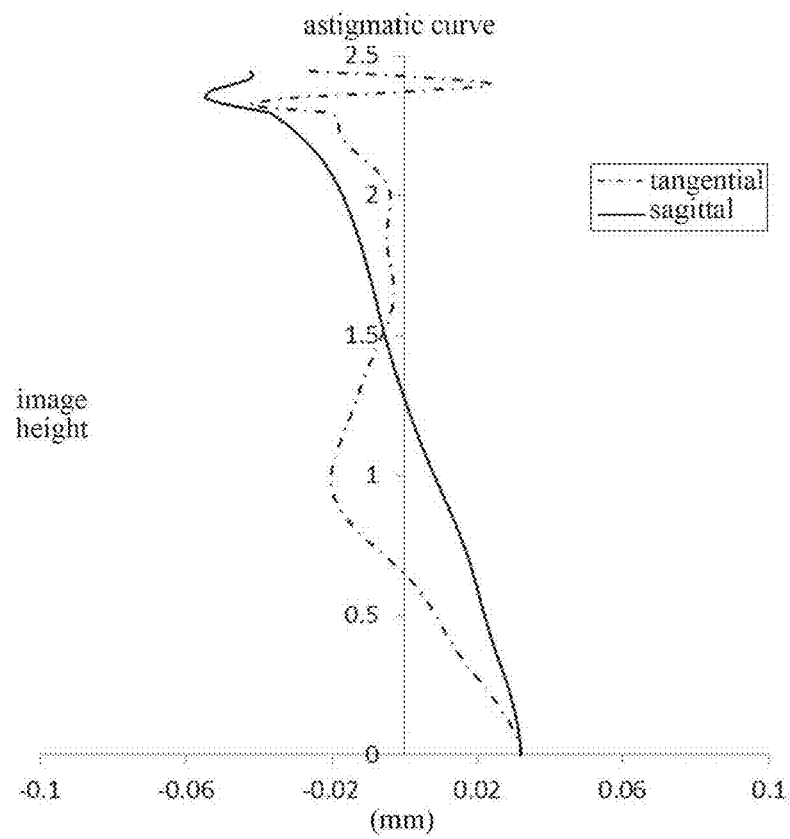
Figure 14C:
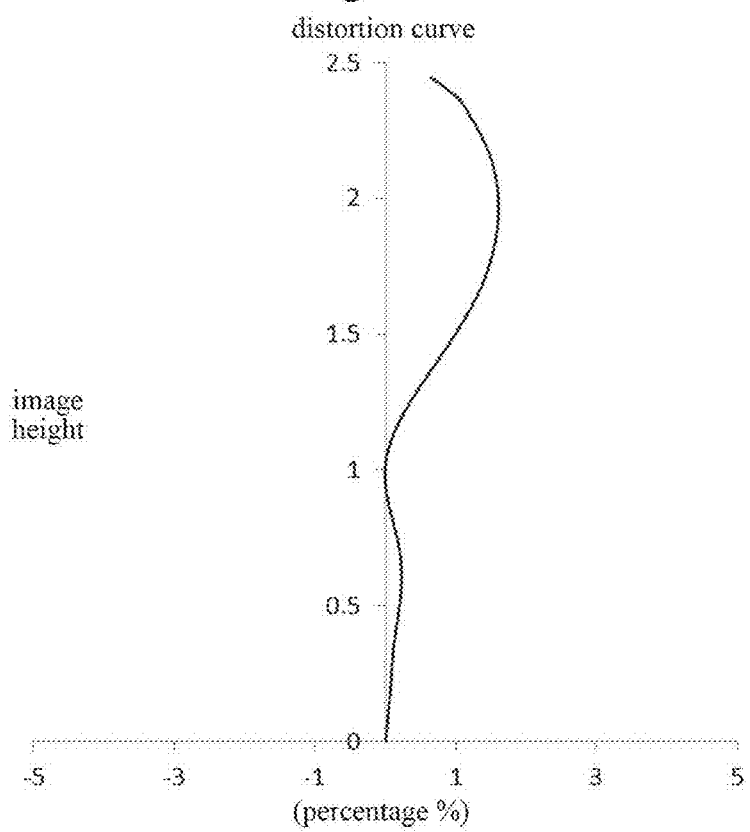
Figure 14D:
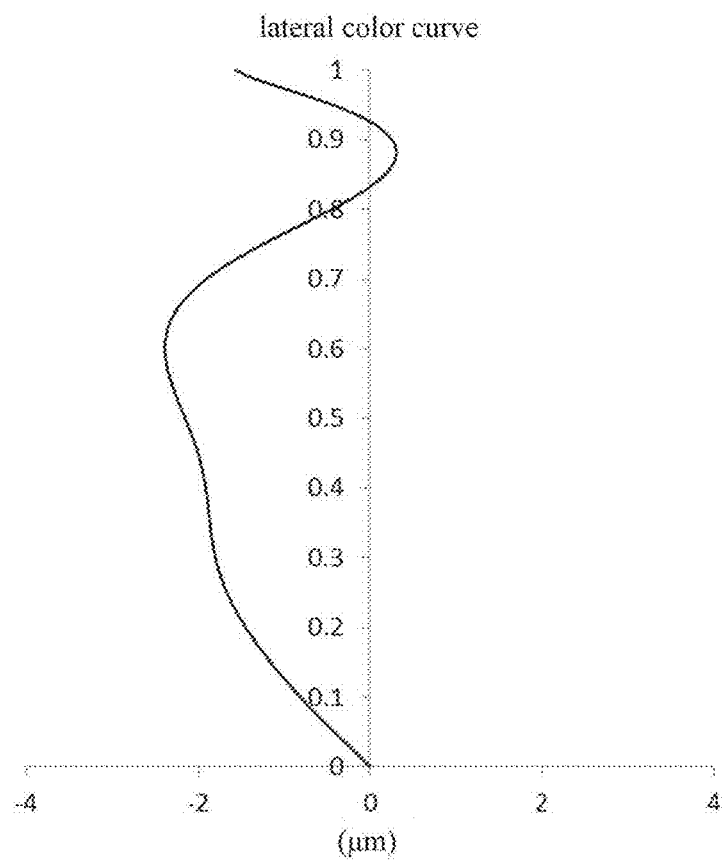

FIG. 14A illustrates the longitudinal aberration curve of the optical imaging lens assembly according to Embodiment 7, representing deviations of focal points of light of different wavelengths converged after passing through the lens assembly. FIG. 14B illustrates the astigmatic curve of the optical imaging lens assembly according to Embodiment 7, representing a curvature of the tangential image plane and a curvature of the sagittal image plane. FIG. 14C illustrates the distortion curve of the optical imaging lens assembly according to Embodiment 7, representing amounts of distortion at different viewing angles. FIG. 14D illustrates the lateral color curve of the optical imaging lens assembly according to Embodiment 7, representing deviations of different image heights on the image plane after light passes through the lens assembly. It can be seen from FIGS. 14A-14D that the optical imaging lens assembly according to Embodiment 7 can achieve a good imaging quality.

Embodiment 8

Figure 15:
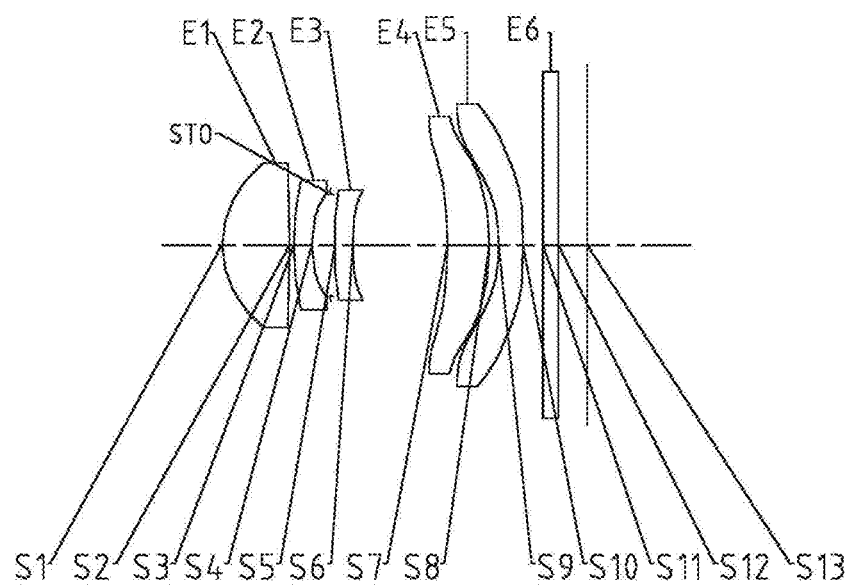
FIG. 15 is a schematic structural diagram illustrating an optical imaging lens assembly according to Embodiment 8 of the present disclosure.

An optical imaging lens assembly according to Embodiment 8 of the present disclosure is described below with reference to FIGS. 15-16D. FIG. 15 is a schematic structural diagram illustrating the optical imaging lens assembly according to Embodiment 8 of the present disclosure.

As shown in FIG. 15, the optical imaging lens assembly includes, sequentially along an optical axis from an object side to an image side:

A first lens E1 having a positive refractive power, an object-side surface S1 of the first lens E1 is a convex surface, and an image-side surface S2 of the first lens E1 is a convex surface. The object-side surface S1 and the image-side surface S2 of the first lens E1 are both aspheric surfaces.

A second lens E2 having a negative refractive power, an object-side surface S3 of the second lens E2 is a convex surface, and an image-side surface S4 of the second lens E2 is a concave surface. The object-side surface S3 and the image-side surface S4 of the second lens E2 are both aspheric surfaces.

A third lens E3 having a negative refractive power, an object-side surface S5 of the third lens E3 is a concave surface, and an image-side surface S6 of the third lens E3 is a concave surface. The object-side surface S5 and the image-side surface S6 of the third lens E3 are both aspheric surfaces.

A fourth lens E4 having a positive refractive power, an object-side surface S7 of the fourth lens E4 is a conave surface, and an image-side surface S8 of the fourth lens E4 is a convex surface. The object-side surface S7 and the image-side surface S8 of the fourth lens E4 are both aspheric surfaces.

A fifth lens E5 having a negative refractive power, an object-side surface S9 of the fifth lens E5 is a concave surface, and an image-side surface S10 of the fifth lens E5 is a convex surface. The object-side surface S9 and the image-side surface S10 of the fifth lens E5 are both aspheric surfaces.

The optical imaging lens assembly may further include a photosensitive element disposed on an image plane S13. Alternatively, an optical filter E6 having an object-side surface S11 and an image-side surface S12 may be disposed between the fifth lens E5 and the image plane S13. Light from an object sequentially passes through the surfaces S1-S12 and finally forms an image on the image plane S13.

Alternatively, a diaphragm STO for limiting light beams may be disposed between the second lens E2 and the third lens E3, to further improve the imaging quality of the lens assembly.

Table 22 shows the surface type, the radius of curvature, the thickness, the material and the conic coefficient of each lens of the optical imaging lens assembly in Embodiment 8. The radius of curvature and the thickness are shown in millimeters (mm). Table 23 shows the high-order coefficients applicable to each aspheric surface in Embodiment 8. The surface type of each aspheric surface may be defined by the formula (1) given in Embodiment 1. Table 24 shows the effective focal lengths f1-f5 of the lenses in Embodiment 8, the total effective focal length f of the optical imaging lens assembly, the total track length TTL of the optical imaging lens assembly, and the half of the diagonal length ImgH of the effective pixel area on the image plane S13 of the optical imaging lens assembly.

TABLE 22

| surface number | surface type | radius of curvature | thickness | refractive index | abbe number | conic coefficient |
|---|---|---|---|---|---|---|
| OBJ | spherical | infinite | infinite | | | |
| S1 | aspheric | 1.3581 | 0.9127 | 1.55 | 56.1 | 0.1427 |
| S2 | aspheric | −9.4374 | 0.0600 | | | −15.3543 |
| S3 | aspheric | 4.5965 | 0.2400 | 1.67 | 20.4 | 15.9674 |
| S4 | aspheric | 1.5600 | 0.2556 | | | 0.5003 |
| STO | spherical | infinite | 0.0601 | | | 0.0000 |
| S5 | aspheric | −16.8909 | 0.2400 | 1.55 | 56.1 | −49.3423 |
| S6 | aspheric | 5.3774 | 1.2833 | | | −3.8148 |
| S7 | aspheric | −6.5036 | 0.5687 | 1.65 | 23.5 | 13.8094 |
| S8 | aspheric | −4.5319 | 0.1247 | | | −15.2678 |
| S9 | aspheric | −3.7922 | 0.3300 | 1.54 | 55.8 | −7.7297 |
| S10 | aspheric | −26.3490 | 0.2719 | | | −87.8402 |
| S11 | spherical | infinite | 0.2100 | 1.52 | 64.2 | |
| S12 | spherical | infinite | 0.3931 | | | |
| S13 | spherical | infinite | | | | |

TABLE 20

| surface number | A4 | A6 | A8 | A10 | A12 |
|---|---|---|---|---|---|
| S1 | −5.0831E−03 | −4.9156E−02 | 1.4776E−01 | −2.8654E−01 | 2.4335E−01 |
| S2 | −2.1051E−02 | 4.7062E−01 | −1.5140E+00 | 2.6058E+00 | −2.3305E+00 |
| S3 | −1.6582E−01 | 6.3167E−01 | −6.3059E−01 | −3.7578E+00 | 1.7983E+01 |
| S4 | −1.3459E−01 | 1.0824E+00 | −6.9271E+00 | 4.8944E+01 | −2.2863E+02 |
| S5 | 2.8337E−01 | −8.5062E−01 | 9.5770E+00 | −6.3238E+01 | 2.5929E+02 |
| S6 | 2.7743E−01 | 6.9732E−01 | −8.5855E+00 | 5.8664E+01 | −2.4863E+02 |
| S7 | −5.5156E−02 | 3.3313E−01 | −8.8669E−01 | 1.2452E+00 | −1.0378E+00 |
| S8 | −1.8112E−01 | 2.6031E−01 | −2.3144E−01 | 8.9406E−02 | −2.3829E−04 |
| S9 | −1.6394E−01 | −6.3485E−01 | 1.9621E+00 | −2.4127E+00 | 1.6417E+00 |
| S10 | −5.3694E−02 | −4.5152E−01 | 9.1128E−01 | −8.4585E−01 | 4.5951E−01 |

| surface number | A14 | A16 | A18 | A20 |
|---|---|---|---|---|
| S1 | 6.1936E−03 | −1.9246E−01 | 1.4443E−01 | −3.6215E−02 |
| S2 | 3.7934E−01 | 1.2175E+00 | −1.0586E+00 | 2.8001E−01 |
| S3 | −3.7348E+01 | 4.2734E+01 | −2.6117E+01 | 6.6695E+00 |
| S4 | 6.7033E+02 | −1.1816E+03 | 1.1462E+03 | −4.6813E+02 |
| S5 | −6.7137E+02 | 1.0678E+03 | −9.5152E+02 | 3.6400E+02 |
| S6 | 6.5396E+02 | −1.0400E+03 | 9.1521E+02 | −3.4178E+02 |
| S7 | 5.2584E−01 | −1.5742E−01 | 2.5472E−02 | −1.7120E−03 |
| S8 | −1.6359E−02 | 8.7611E−03 | −2.1310E−03 | 1.9880E−04 |
| S9 | −6.6581E−01 | 1.6083E−01 | −2.1441E−02 | 1.2178E−03 |
| S10 | −1.5479E−01 | 3.1903E−02 | −3.6915E−03 | 1.8385E−04 |

TABLE 21

| | parameter | | | | | | |
|---|---|---|---|---|---|---|---|
| | f1 (mm) | f2 (mm) | f3 (mm) | f4 (mm) | f5 (mm) | f (mm) | TTL (mm) | ImgH (mm) |
| numerical value | 2.24 | −3.66 | −7.44 | 20.87 | −8.30 | 5.56 | 4.56 | 2.23 |

Figure 16A:
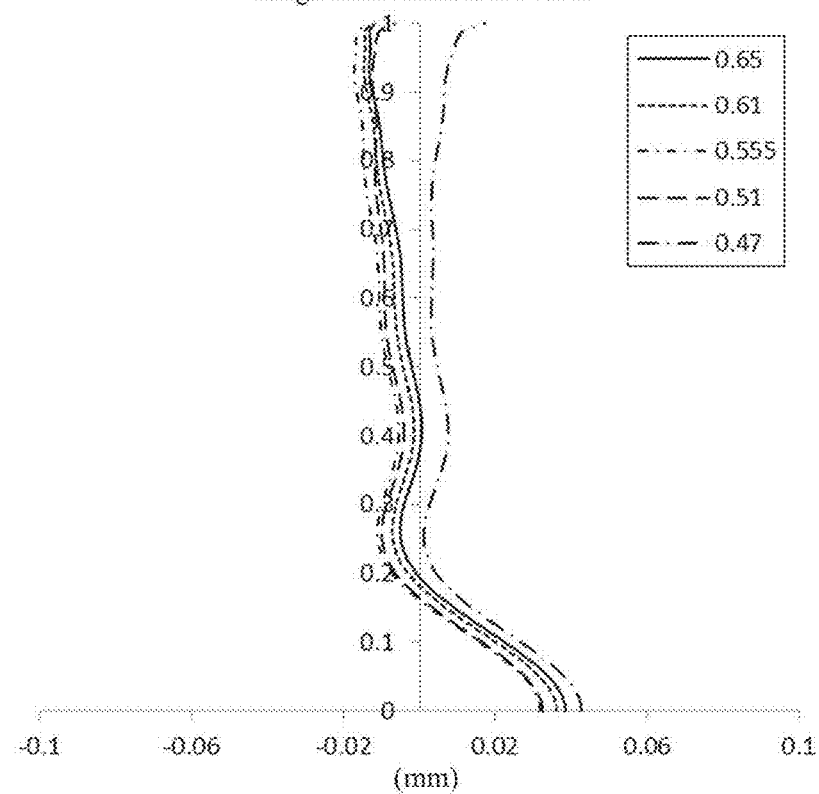
FIGS. 16A-16D respectively illustrate a longitudinal aberration curve, an astigmatic curve, a distortion curve, and a lateral color curve of the optical imaging lens assembly according to Embodiment 8.
Figure 16B:
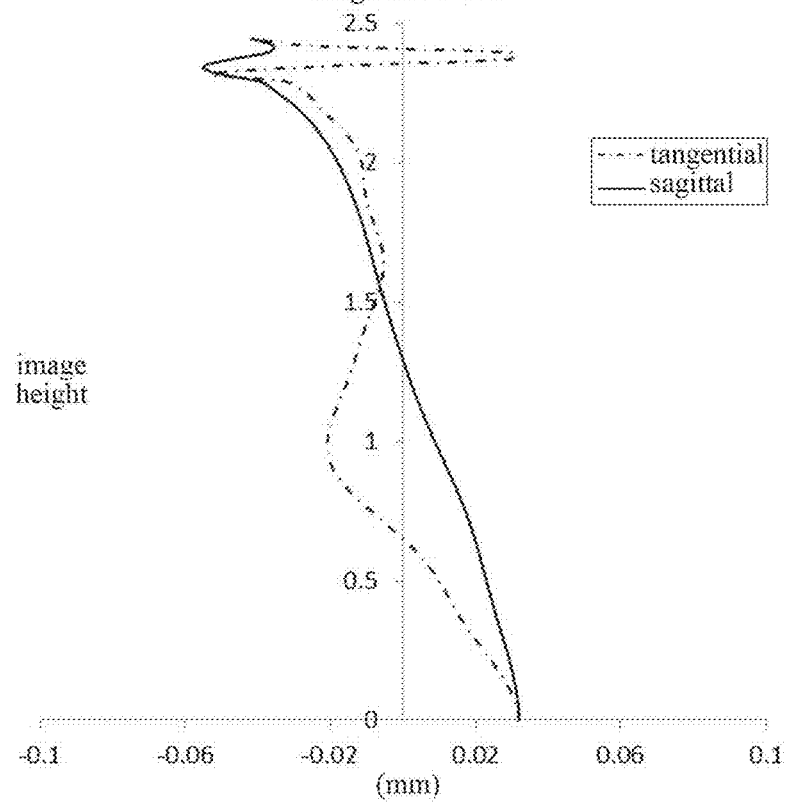
Figure 16C:
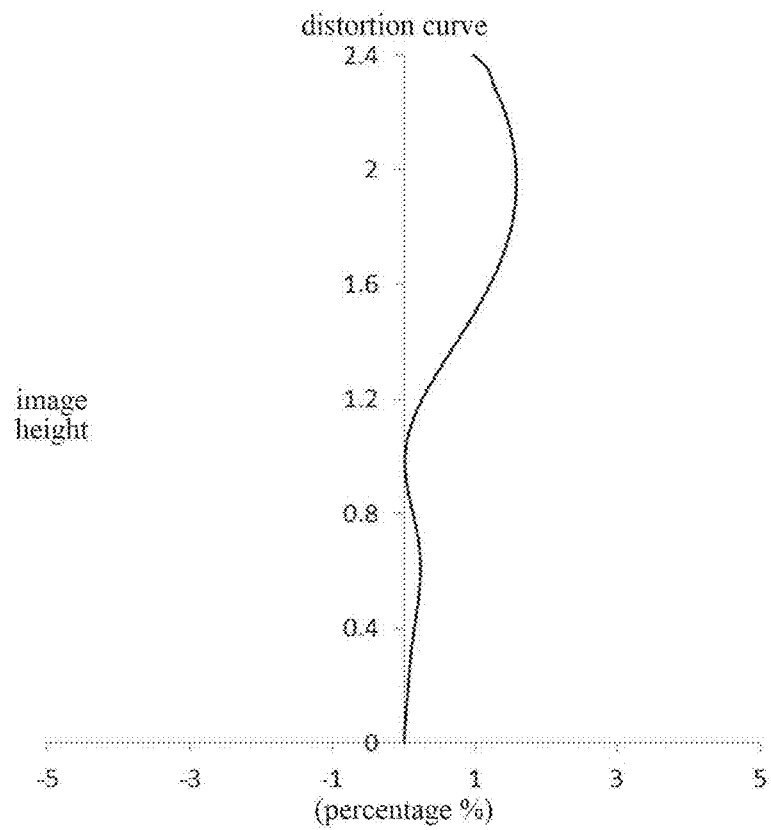
Figure 16D:
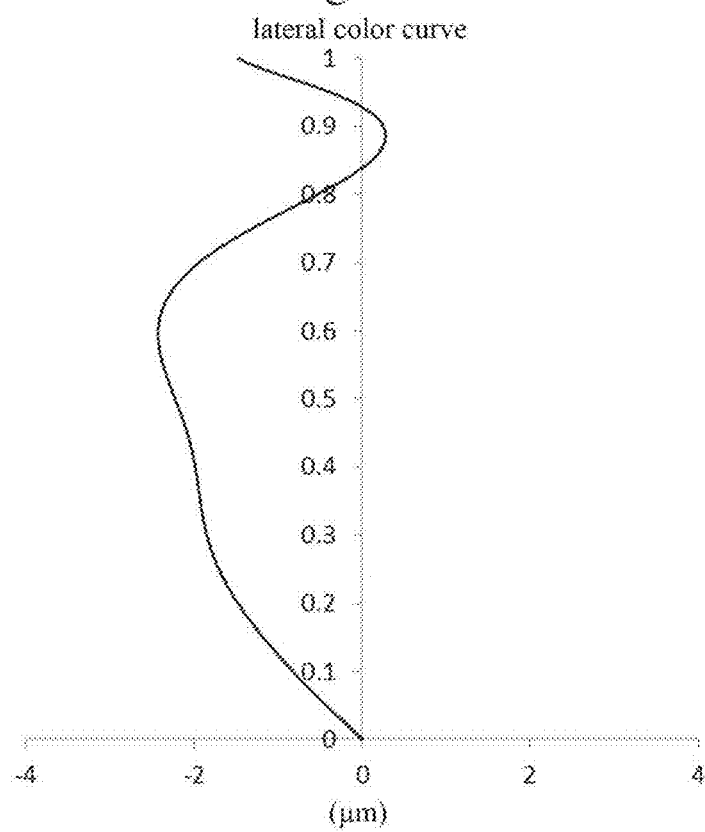

FIG. 16A illustrates the longitudinal aberration curve of the optical imaging lens assembly according to Embodiment 8, representing deviations of focal points of light of different wavelengths converged after passing through the lens assembly. FIG. 16B illustrates the astigmatic curve of the optical imaging lens assembly according to Embodiment 8, representing a curvature of the tangential image plane and a curvature of the sagittal image plane. FIG. 16C illustrates the distortion curve of the optical imaging lens assembly according to Embodiment 8, representing amounts of distortion at different viewing angles. FIG. 16D illustrates the lateral color curve of the optical imaging lens assembly according to Embodiment 8, representing deviations of different image heights on the image plane after light passes through the lens assembly. It can be seen from FIGS. 16A-16D that the optical imaging lens assembly according to Embodiment 8 can achieve a good imaging quality.

To sum up, Embodiments 1-8 respectively satisfy: the relationships shown in Table 25 below.

TABLE 25

| Conditional Expression | Embodiment | | | | | | | |
|---|---|---|---|---|---|---|---|---|
| | 1 | 2 | 3 | 4 | 5 | 6 | 7 | 8 |
| TTL/f | 0.86 | 0.91 | 0.89 | 0.89 | 0.78 | 0.89 | 0.82 | 0.82 |
| f123/T34 | 5.95 | 4.18 | 4.35 | 3.89 | 3.88 | 5.24 | 3.82 | 3.89 |
| SL/TTL | 0.79 | 0.85 | 0.81 | 0.70 | 0.79 | 0.85 | 0.77 | 0.76 |
| f/R10 | −0.55 | −0.45 | −0.03 | −0.20 | −0.19 | −0.04 | −0.23 | −0.21 |
| R4/R3 | 0.10 | 0.35 | 0.36 | 0.34 | 0.35 | 0.47 | 0.34 | 0.34 |
| f1/f2 | −0.76 | −0.59 | −0.64 | −0.61 | −0.61 | −0.68 | −0.61 | −0.61 |
| T12 (mm) | 0.50 | 0.12 | 0.10 | 0.06 | 0.06 | 0.20 | 0.06 | 0.06 |
| f/f45 | −0.62 | −0.29 | −0.61 | −0.42 | −0.44 | −0.56 | −0.43 | −0.42 |
| |V4 − V5| | 35.40 | 32.30 | 32.30 | 32.30 | 32.30 | 32.30 | 32.30 | 32.30 |
| R7/R10 | 1.31 | 0.68 | 0.02 | 0.23 | 0.24 | 0.05 | 0.27 | 0.25 |
| T23/CT3 | 2.43 | 1.20 | 1.25 | 1.29 | 1.30 | 2.21 | 1.31 | 1.32 |

The present disclosure further provides an imaging device having a photosensitive element which may be a photosensitive charge-coupled device (CCD) or complementary metal-oxide semiconductor (CMOS) element. The imaging device may be an independent camera device such as a digital camera, or may be an imaging module integrated in a mobile electronic device such as a mobile phone. The imaging device is equipped with the optical imaging lens assembly described above.

The foregoing is only a description for the preferred embodiments of the present disclosure and the applied technical principles. It should be appreciated by those skilled in the art that the inventive scope of the present disclosure is not limited to the technical solution formed by the particular combinations of the above technical features. The inventive scope should also cover other technical solutions formed by any combinations of the above technical features or equivalent features thereof without departing from the concept of the invention, for example, technical solutions formed by replacing the features as disclosed in the present disclosure with (but not limited to) technical features with similar functions.

What is claimed is:

1. An optical imaging lens assembly comprising, sequentially along an optical axis from an object side to an image side, a first lens, a second lens, a third lens, a fourth lens, and a fifth lens,
    wherein each of the first lens and the fourth lens has a positive refractive power;
    the third lens has a negative refractive power;
    at least two of the second lens, the third lens, and the fifth lens have negative refractive powers;
    an object-side surface of the first lens and an object-side surface of the second lens are convex surfaces;
    an image-side surface of the second lens and an object-side surface of the fourth lens are concave surfaces;
    an image-side surface of the fifth lens is a convex surface, and a radius of curvature R10 of the image-side surface of the fifth lens and a total effective focal length f of the optical imaging lens assembly satisfy: −1.0<f/R10<0; and
    a spacing distance T23 on the optical axis between the second lens and the third lens and a center thickness CT3 of the third lens on the optical axis satisfy: 1.20≤T23/CT3≤2.43.

2. The optical imaging lens assembly according to claim 1, further comprising a diaphragm, wherein an axial distance SL from the diaphragm to an image plane of the optical imaging lens assembly and an axial distance TTL from the object-side surface of the first lens to the image plane of the optical imaging lens assembly satisfy: SL/TTL≤0.9.

3. The optical imaging lens assembly according to claim 1, wherein an abbe number V4 of the fourth lens and an abbe number V5 of the fifth lens satisfy: |V4−V5|>20.

4. The optical imaging lens assembly according to claim 1, wherein a combined refractive power of the fourth lens and the fifth lens is a negative refractive power, and a combined focal length f45 of the fourth lens and the fifth lens and the total effective focal length f of the optical imaging lens assembly satisfy: −1.0<f/f45<−0.2.

5. The optical imaging lens assembly according to claim 1, wherein a spacing distance T12 on the optical axis between the first lens and the second lens satisfies: 0.05 mm≤T12≤0.5 mm.

6. The optical imaging lens assembly according to claim 1, wherein a radius of curvature R3 of the object-side surface of the second lens and a radius of curvature R4 of the image-side surface of the second lens satisfy: 0<R4/R3≤0.5.

7. The optical imaging lens assembly according to claim 1, wherein the axial distance TTL from the object-side surface of the first lens to the image plane of the optical imaging lens assembly and the total effective focal length f of the optical imaging lens assembly satisfy: TTL/f<0.95.

8. An optical imaging lens assembly comprising, sequentially along an optical axis from an object side to an image side, a first lens, a second lens, a third lens, a fourth lens, and a fifth lens,
    wherein each of the first lens and the fourth lens has a positive refractive power;
    the third lens has a negative refractive power;
    at least two of the second lens, the third lens, and the fifth lens have negative refractive powers;
    a spacing distance T12 on the optical axis between the first lens and the second lens satisfies: 0.05 mm≤T12≤0.5 mm;
    a combined focal length f123 of the first lens, the second lens, and the third lens and a spacing distance T34 on the optical axis between the third lens and the fourth lens satisfy: 3.5<f123/T34<7.0;

a spacing distance T23 on the optical axis between the second lens and the third lens and a center thickness CT3 of the third lens on the optical axis satisfy: $1.20 \leq T23/CT3 \leq 2.43$, and an axial distance TTL from an object-side surface of the first lens to an image plane of the optical imaging lens assembly and the total effective focal length f of the optical imaging lens assembly satisfy: $TTL/f<0.95$.

9. The optical imaging lens assembly according to claim 8, wherein a combined refractive power of the fourth lens and the fifth lens is a negative refractive power, and a combined focal length f45 of the fourth lens and the fifth lens and a total effective focal length f of the optical imaging lens assembly satisfy: $-1.0<f/f45<-0.2$.

10. The optical imaging lens assembly according to claim 8, wherein a radius of curvature R3 of the object-side surface of the second lens and a radius of curvature R4 of the image-side surface of the second lens satisfy: $0<R4/R3 \leq 0.5$.

11. The optical imaging lens assembly according to claim 8, further comprising a diaphragm, wherein an axial distance SL from the diaphragm to an image plane of the optical imaging lens assembly and an axial distance TTL from an object-side surface of the first lens to the image plane of the optical imaging lens assembly satisfy: $SL/TTL \leq 0.9$.

* * * * *